US009889872B2

(12) United States Patent
Somerset et al.

(10) Patent No.: US 9,889,872 B2
(45) Date of Patent: Feb. 13, 2018

(54) MULTI-FUNCTION MOBILITY DEVICE

(71) Applicant: Ignio LLC, Bloomfield Hills, MI (US)

(72) Inventors: Darren W. Somerset, Bloomfield Hills, MI (US); Sunil Lall, Bloomfield Hills, MI (US)

(73) Assignee: Ignio LLC, Bloomfield Hills, MI (US)

( * ) Notice: Subject to any disclaimer, the term of this patent is extended or adjusted under 35 U.S.C. 154(b) by 0 days.

(21) Appl. No.: 15/082,173

(22) Filed: Mar. 28, 2016

(65) Prior Publication Data

US 2017/0274919 A1    Sep. 28, 2017

(51) Int. Cl.
| | | |
|---|---|---|
| *B62B 9/12* | (2006.01) | |
| *B62B 7/00* | (2006.01) | |
| *B62B 7/02* | (2006.01) | |
| *B62B 7/04* | (2006.01) | |
| *B62B 9/20* | (2006.01) | |

(52) U.S. Cl.
CPC .............. *B62B 9/12* (2013.01); *B62B 7/008* (2013.01); *B62B 7/02* (2013.01); *B62B 7/046* (2013.01); *B62B 9/20* (2013.01)

(58) Field of Classification Search
CPC .. B62B 9/12; B62B 7/008; B62B 7/02; B62B 7/046; B62B 9/20
USPC ........................................................ 280/685
See application file for complete search history.

(56) References Cited

U.S. PATENT DOCUMENTS

| | | | |
|---|---|---|---|
| 2,582,143 A * | 1/1952 | Maas ........................ | B62B 7/02 |
| | | | 280/648 |
| 5,076,599 A | 12/1991 | Lockett et al. | |
| 5,176,395 A | 1/1993 | Garforth-Bles | |
| 5,259,634 A | 11/1993 | Berner et al. | |
| 5,301,963 A | 4/1994 | Chen | |
| 5,318,318 A | 6/1994 | Berner et al. | |
| 5,421,597 A | 6/1995 | Berner | |
| 5,599,033 A | 2/1997 | Kolbus et al. | |
| 5,611,560 A | 3/1997 | Thimmig | |
| 6,196,572 B1 | 3/2001 | Durrin | |
| 6,443,467 B1 * | 9/2002 | Black ...................... | B62B 7/046 |
| | | | 280/47.38 |

(Continued)

OTHER PUBLICATIONS

International Search Report dated Jun. 5, 2017; International application No. PCT/US2017/024073; Applicant: Ignio LLC; 12 Pages.

*Primary Examiner* — James A Shriver, II
*Assistant Examiner* — Brian L Cassidy
(74) *Attorney, Agent, or Firm* — Reising Ethington, P.C.

(57) ABSTRACT

A multi-function stroller may comprise a lower chassis shell and an upper occupant shell connected by a quick release pivot joint that provides occupant accommodation that is secure and comfortable. In addition, the structural architecture is designed to allow safe adaptations to the axle configuration. Through flexible suspension arm mounting the suspension-hub-wheel/tire assembly can be quickly assembled/disassembled to provide alternative usage axle layouts. An ergonomic handle assembly may be coupled with the structure for pushing, pulling, towing, carrying, etc. When disassembled, the multi-function stroller can be folded into a compact storage mode. Thus, non-compromised performance, versatility, and usage functionality can be readily achieved and accomplished in a safe manner.

18 Claims, 20 Drawing Sheets

(56) References Cited

U.S. PATENT DOCUMENTS

| | | | |
|---|---|---|---|
| 7,234,722 B1* | 6/2007 | Madigan | B62B 7/002 280/47.38 |
| 7,364,183 B2* | 4/2008 | Lee | B62B 7/142 280/42 |
| 7,367,581 B2* | 5/2008 | Yang | B62B 7/14 280/642 |
| 7,426,970 B2* | 9/2008 | Olsen | A61G 5/046 180/65.1 |
| 7,487,978 B2* | 2/2009 | Tutmaz | B62B 9/26 224/409 |
| 7,712,765 B2* | 5/2010 | Chen | B62B 7/08 280/642 |
| 7,753,398 B2* | 7/2010 | Yang | B62B 9/102 280/642 |
| 7,832,755 B2* | 11/2010 | Nolan | B62B 7/068 280/47.18 |
| 7,896,384 B2 | 3/2011 | Schonfeld | |
| 8,262,103 B2* | 9/2012 | Enserink | B62B 7/12 280/204 |
| 8,444,171 B2 | 5/2013 | Smith et al. | |
| 8,485,546 B2* | 7/2013 | Li | B62B 7/08 280/642 |
| 8,567,866 B2* | 10/2013 | Carimati Di Carimate | A47D 1/008 297/184.13 |
| 8,596,670 B2* | 12/2013 | di Carimate | B62B 7/008 280/47.38 |
| 8,657,311 B2* | 2/2014 | Li | B62B 7/14 280/47.39 |
| 8,844,964 B2* | 9/2014 | Chiang | B62B 7/14 280/642 |
| 8,882,134 B2* | 11/2014 | Rolicki | B62B 7/04 280/642 |
| 8,899,615 B2* | 12/2014 | Dijkstra | B62B 7/14 280/42 |
| 8,936,261 B2* | 1/2015 | Yuan | B62B 7/008 280/47.38 |
| 9,073,585 B2* | 7/2015 | Jackson | B62D 31/006 |
| 9,227,648 B2* | 1/2016 | Sundberg | B62B 7/12 |
| 9,242,585 B2* | 1/2016 | Kozinski | B60N 2/2848 |
| 9,365,225 B2* | 6/2016 | Henao | B62B 3/02 |
| 9,428,208 B1* | 8/2016 | Chen | B62B 9/18 |
| 2004/0169344 A1* | 9/2004 | Seeberger | B62B 1/04 280/47.38 |
| 2006/0237932 A1* | 10/2006 | Moore, II | B62B 7/00 280/47.41 |
| 2006/0290107 A1* | 12/2006 | Powers | B62B 7/06 280/658 |
| 2007/0075525 A1 | 4/2007 | Nolan et al. | |
| 2008/0258436 A1* | 10/2008 | Storm | B62B 7/062 280/642 |
| 2010/0072732 A1* | 3/2010 | Offord | B62B 9/28 280/647 |
| 2013/0069327 A1* | 3/2013 | Tran | B62B 7/14 280/47.39 |
| 2013/0270800 A1* | 10/2013 | Chiang | B62B 7/14 280/658 |
| 2013/0292923 A1* | 11/2013 | Burchi | B62B 7/06 280/647 |
| 2015/0021877 A1* | 1/2015 | Kim | B62K 13/04 280/282 |
| 2015/0353116 A1* | 12/2015 | Leys | B62B 7/12 280/648 |
| 2016/0288813 A1* | 10/2016 | Burns | A63H 33/006 |
| 2016/0339940 A1* | 11/2016 | Lee | B62B 9/102 |

* cited by examiner

VIEW A

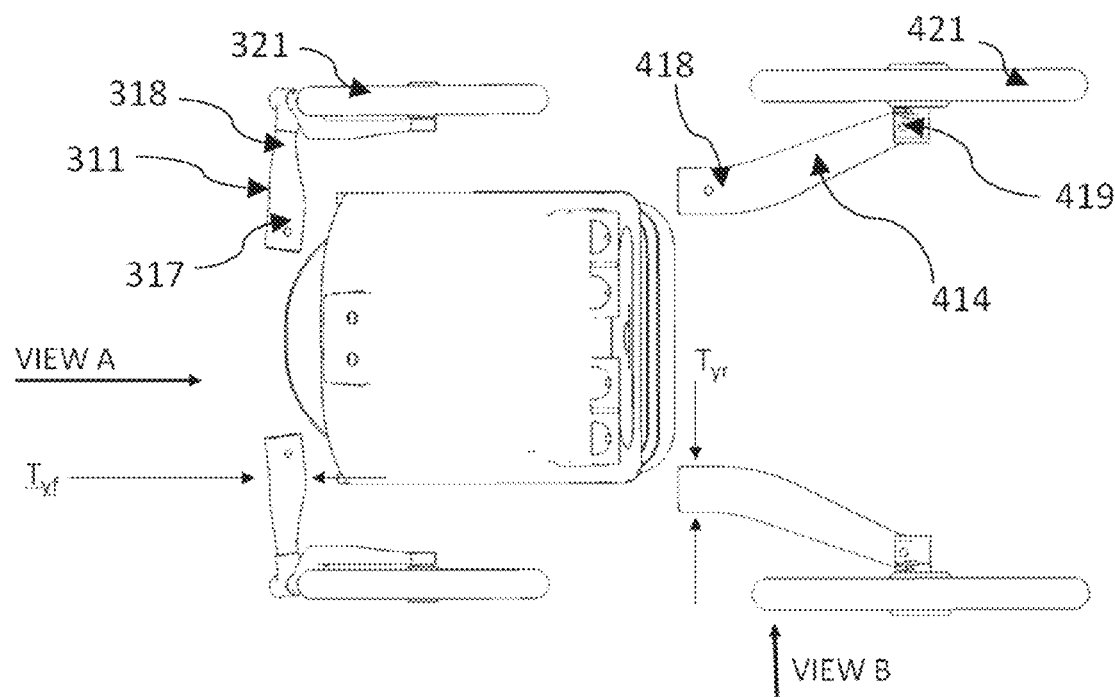
FIG. 16A
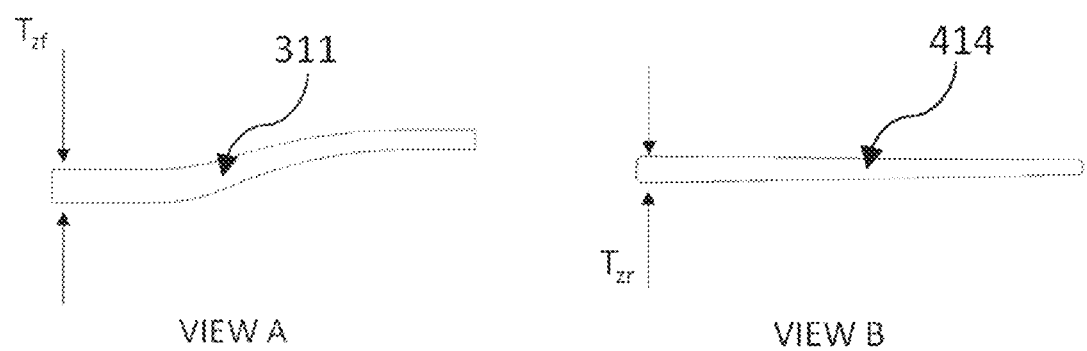
VIEW A
FIG. 16B
VIEW B
FIG. 16C

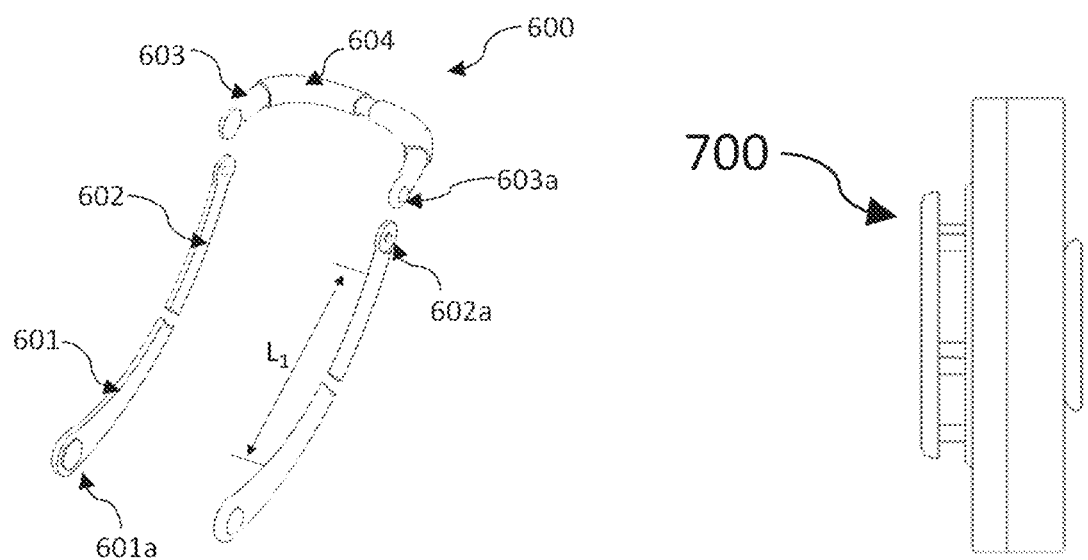
FIG. 21
FIG. 22B
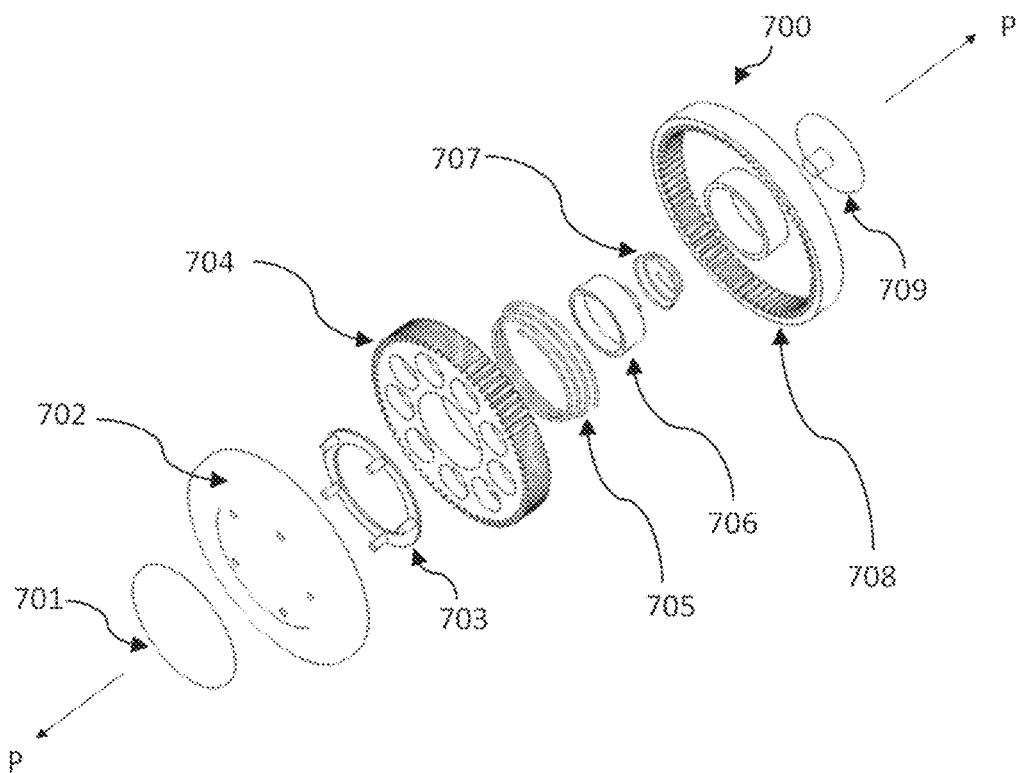
FIG. 22A

Locked mode - 1

Rotate mode - 2

Release mode - 3

MULTI-FUNCTION MOBILITY DEVICE

BACKGROUND

The juvenile durable consumer product industry is a several billion dollar business segment globally per annum. Within this segment there are various products that provide wheeled mobility for a child occupant, including strollers, bicycle trailer carriages, and wagons.

The stroller (pram, child carrier) is a hand-pushed juvenile mobility device used to carry and transport babies and young infants. There are discrete categories of strollers based on the age of the child occupant and the usage profile: Standard strollers, also called full-size or regular strollers, are usually designed to accommodate babies (0-6 months) lying in the supine position; later (6-36 months) transitioning to upright seated accommodation. Jogging strollers are designed to provide a smooth, stable ride for the occupant and ease of maneuverability and ergonomics for the user at running speeds. Travel systems include a companionable infant car seat and a standard stroller in a single system. Once the child has outgrown the infant car seat, the standard stroller can be used by itself. Lightweight strollers or umbrella strollers are upright seated strollers that can be folded compactly. Their light weight and portability make them user friendly for public transport and maneuvering in crowed areas. Multi-child strollers have a flexible structural design that allow the accommodation of two occupants or more.

Bicycle trailer carriages are motorless wheeled frame devices with a hitch system for transporting child occupants, and are constructed to enhance the comfort and safety of one or more occupants. Trailers usually have a low center of gravity to increase stability when cornering. Single-wheel: a single-wheel design typically has a single rear-mounted wheel. Though of limited towing capacity, this design tends to be more stable than trailers with two or more wheels when moving. The single wheel can tilt from side to side when cornering, as does the bicycle itself, allowing for coordinated turns at relatively high speed. Two-wheel: a two-wheel design provides much greater occupant carrying capacity and a wider occupant bed. Though not suitable for high speed, they are ideal for everyday cycling; very much like towing a trailer behind a car. Two-wheel trailers tend to be as wide or wider than the handlebars of the bicycle, therefore care needs to be taken when riding through narrow spaces.

A Child Wagon is a toy wagon that has the same architecture as the traditional, larger weight capacity utility wagon, but is much smaller and has an open top. An average wagon is able to seat one child, and is generally propelled by human power through a handle at the front.

The aforementioned juvenile mobility devices offer specific and limited functions. In most cases, juvenile mobility devices are manufactured with rolling chassis that are specifically designed for a given function or purpose. In addition, when an OEM (Original Equipment Manufacturer) creates a product that attempts to provide multi-function (i.e. bicycle trailer carriage that converts to a stroller) the chassis architecture limitations lead to compromised performance. Consequently, consumers either purchase an individual device for each specific purpose, that includes a new rolling chassis or accept significant performance degradation when a plurality of functions are combined in a single product.

This lack of consumer options to purchase an optimized structural architecture offering versatility and non-compromised performance for multiple utility leads to: an increased carbon footprint and use of raw materials and resources, high opportunity cost through new purchase depreciation across the multiple bespoke products purchased, and a non-efficient use of homebase storage space and portability when transporting multiple devices.

Thus, a multi-function stroller device that is readily configurable to a user and juvenile occupant's changing needs is desired that provides non-compromised performance for each usage function.

SUMMARY

Many of the challenges noted above may be addressed by a multi-function stroller having a flexible design that is adjustable between a plurality of mobility configurations and usages. Multi-function stroller's occupant structure system may comprise a lower and upper base structure that can be positioned relative to each other to modify occupant accommodation. In addition, the structural architecture is designed to allow safe adaptations to the axle configuration. Through flexible suspension arm mounting, the suspension-hub-wheel/tire assembly can be quickly assembled/disassembled to provide alternative usage axle layouts. Thus non-compromised performance, versatility, and usage functionality can be readily achieved and accomplished in a safe manner.

A multi-function stroller may have a lower and upper structure each comprising a top, bottom, and sidewalls extending therebetween. The sidewalls of the lower and upper structure may contain complex geometric surfaces. The complex geometric surfaces of the sidewalls may be a variety or combination of complex shapes or surfaces, including a mix of curved, flat, and inclined surfaces. Relative location between the upper and lower structure for occupant accommodation may be achieved via a quick release structural joining connector designed to facilitate easy adjustment and positioning. Usage versatility is further enhanced through the upper and lower structures having a plurality of suspension mounting locators that can be configured to connect with flexible suspension assemblies. Through suspension layout flexibility the versatile stroller architecture may be arranged into many mobility configurations, including a four, three, two and one-wheeled axle layout. Additionally, an ergonomic handle assembly coupled with the upper or lower structure may be adjusted and used for many different applications by a wide range of anthropometric percentile users. Based on the ergonomic handle positioning relative to the upper or lower structure, other mobility configurations including: push, pull, tow, and carry mobility configurations can be enabled. Many combinations of mobility configurations are possible, including but not limited to a push or pulled four-wheeled configuration, a push or pulled three-wheeled configuration, a towed or pulled two-wheeled or one-wheeled configuration. Depending on the desired application, a user may select an appropriate axle and handle layout to: push a multi-function stroller in a short wheelbase four-wheeled stroller mobility configuration; push a multi-function stroller as a jogging stroller in a long wheelbase three-wheeled mobility configuration; pull a multi-function stroller as a wagon in a four-wheeled mobility configuration; tow a multi-function stroller as a bicycle trailer carriage in a two or one-wheeled mobility configuration, for example.

In addition to single occupant accommodation the multi-function stroller can be configured to provide double occupant accommodation. This is achieved by combining two individual lower and upper structures side by side via a structural mounting interface. The axle (wheel) layout is then configured to extremities of the combined structure.

Further occupant accommodation can be achieved by repeating the process up to the safe working limits of the suspension system.

If desirable to store and transport the multi-function stroller, it may be folded into a compact fold mode to reduce its fore/aft and height profile.

BRIEF DESCRIPTION OF THE DRAWINGS

FIG. 16A is a exploded bottom and ancillary views of the lower rolling dynamic chassis structure assembly shown in FIG. 12;

FIG. 16B is a close up view of View A of FIG. 16A;

FIG. 16C is a close up view of View B of FIG. 16A;

FIG. 21 is a close up exploded view of the handle assembly shown in FIG. 18;

FIG. 22A is a close up exploded view of the structural pivot connector mechanism shown in FIG. 18;

FIG. 22B is a side view of the structural pivot connector mechanism shown in FIG. 22A;

DETAILED DESCRIPTION

Multiple embodiments of multi-function stroller 100 are described with reference to the drawings, wherein like numerals reference like structures. Although the multi-function stroller 100 may be illustrated and described herein as including particular components in a particular configuration, the components and configuration shown and described are provided for example purposes only. The figures and descriptions of the embodiments described herein are not intended to limit the breadth or the scope of the inventive concepts or the appended claims in any manner. Rather, the figures and detailed descriptions of the multi-function stroller 100 are provided to illustrate the inventive concepts to a person of ordinary skill in the art and to enable such person to make and use the inventive concepts.

Figure 1:
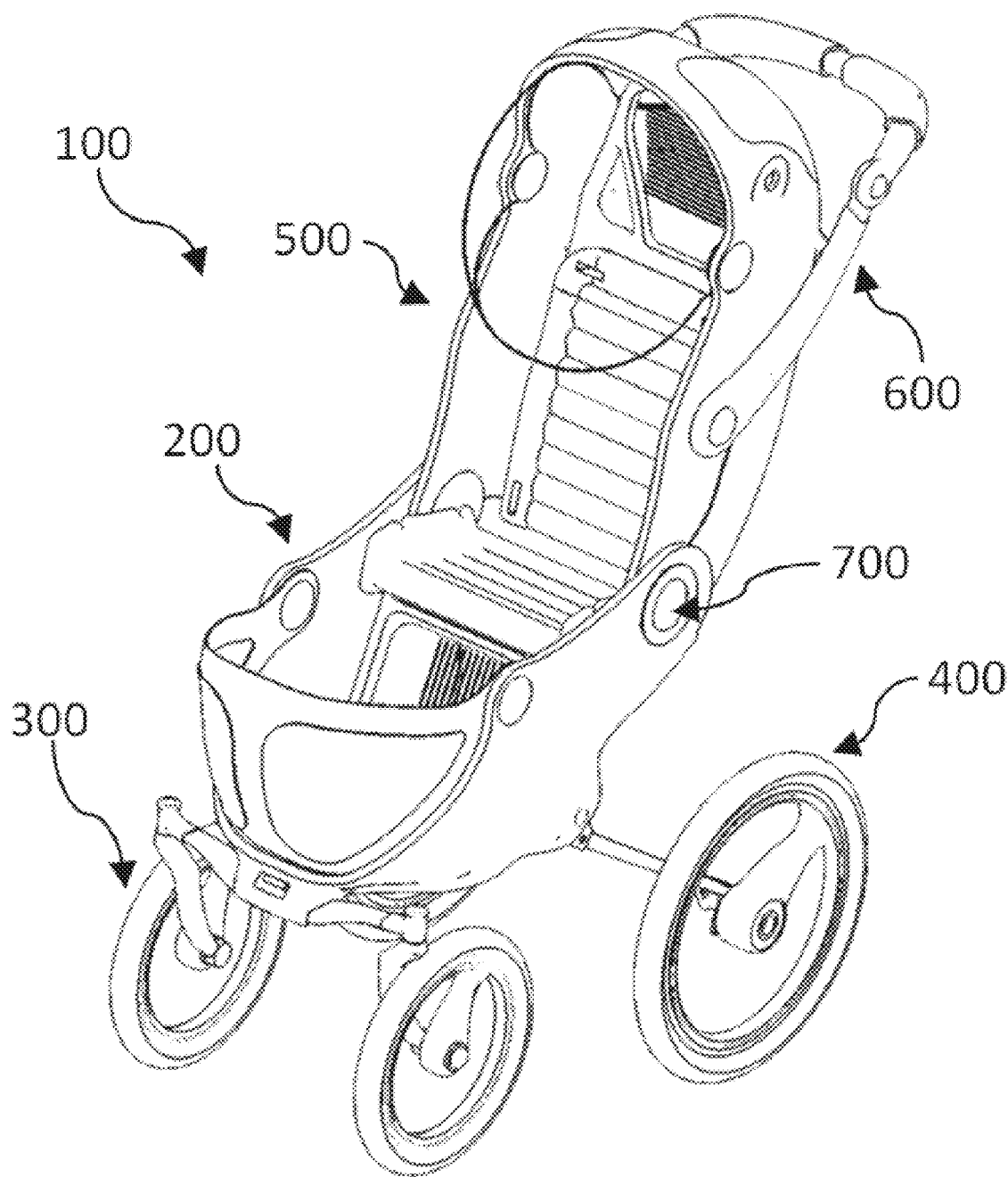
FIG. 1 is a front perspective view of an exemplary multi-function stroller.
Figure 2:
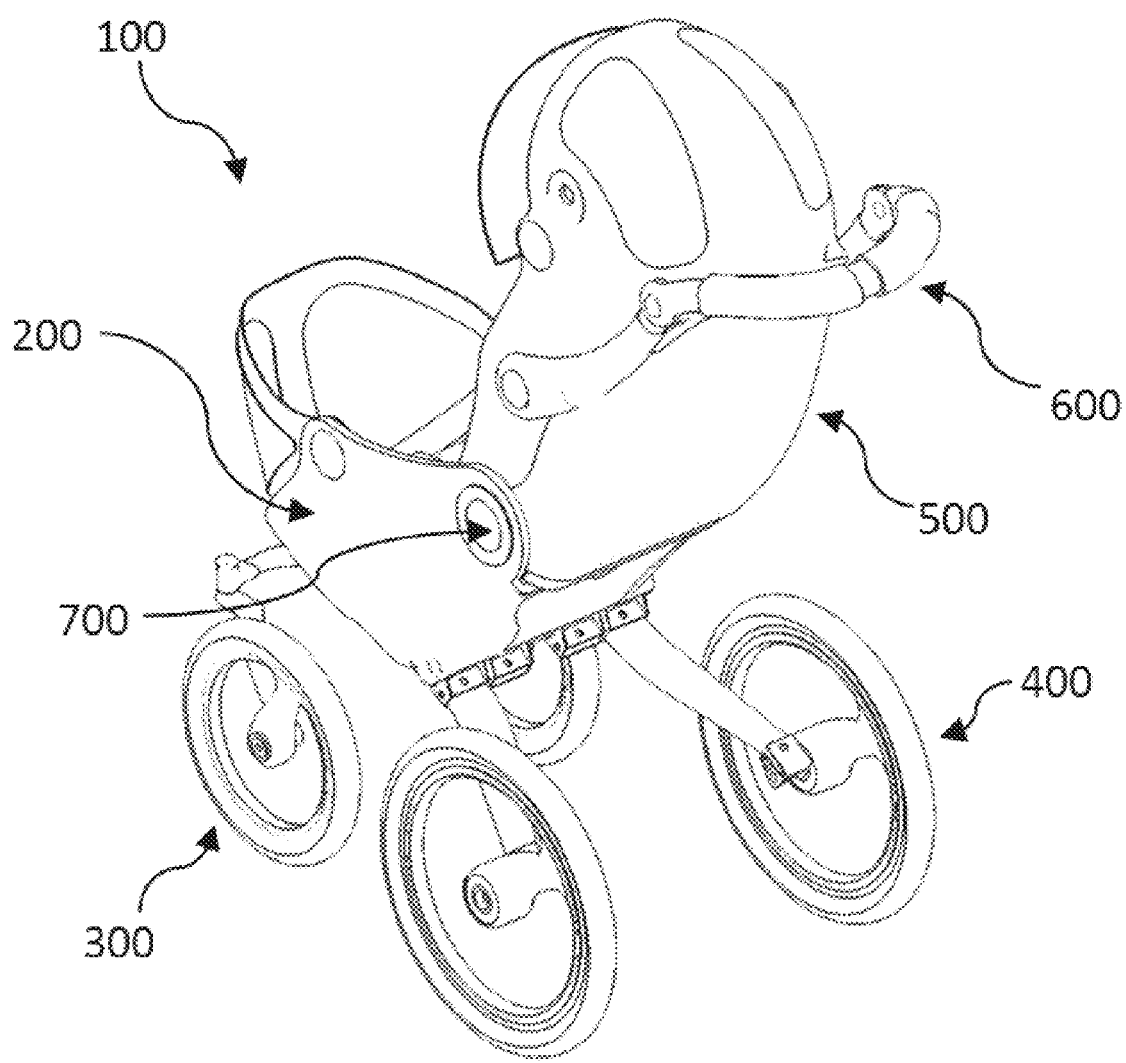
FIG. 2 is rear perspective view of the multi-function stroller of FIG. 1.
Figure 3:
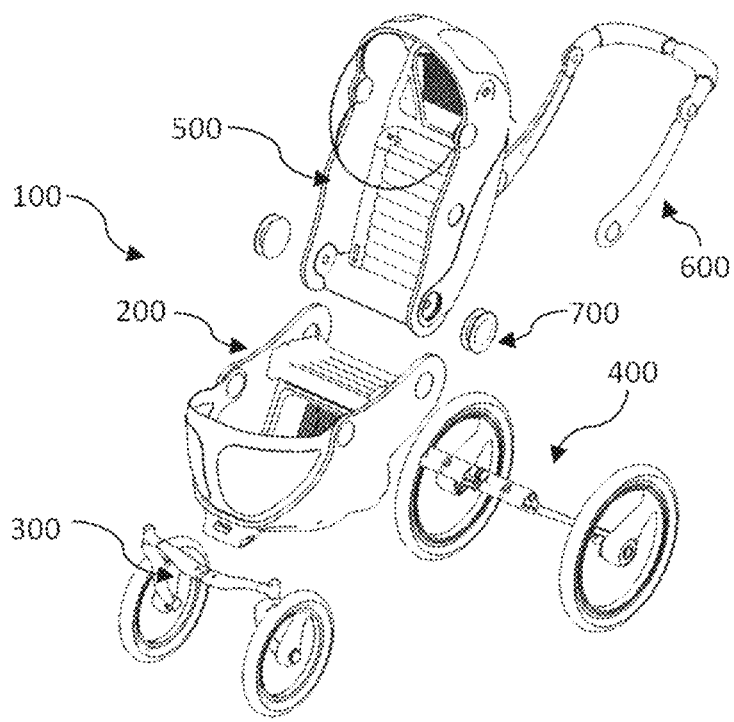
FIG. 3 is an exploded perspective view of the multi-function stroller of FIG. 1.

Turning now to the drawings, FIG. 1, FIG. 2, and FIG. 3 depict perspective and exploded assembly views of an exemplary multi-function stroller 100. The multi-function stroller 100 generally comprises a lower chassis structure 200, front suspension assembly 300, rear suspension assembly 400, an upper structure 500, an adjustable handle assembly 600, and a number of structural pivot connector mechanisms 700. Chassis 200 provides a structural platform that when joined with suspension assemblies 300 and 400 forms a combined rolling dynamic chassis. Chassis 200 also allows multi-function stroller 100 to be configured in a number of different mobility configurations, such as a four-wheeled, three-wheeled, two-wheeled or one-wheeled configuration. This provides flexibility for using the multi-function stroller 100 for any number of uses.

Figure 7A:
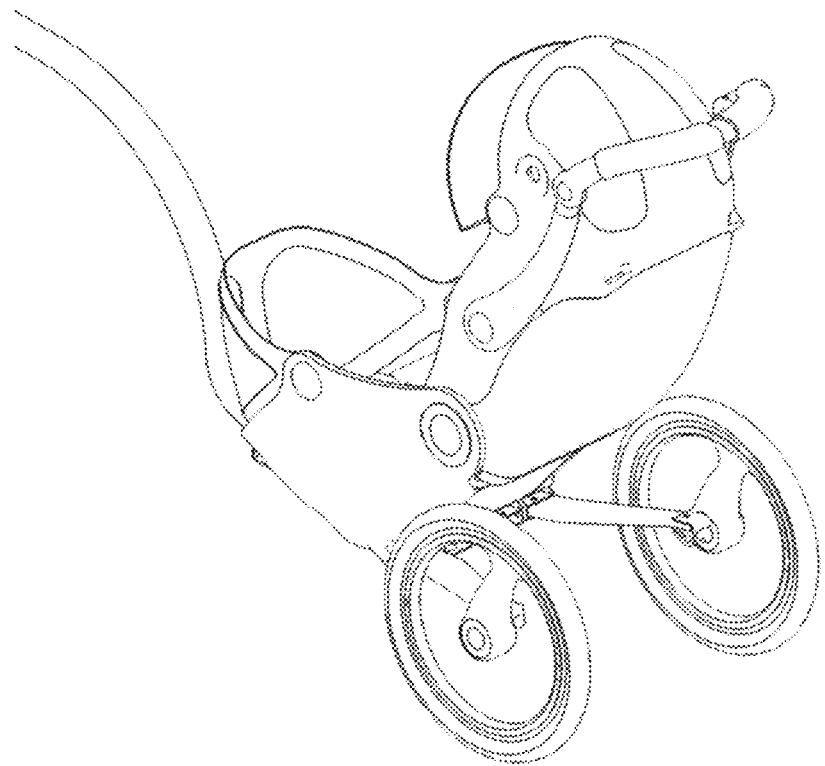
FIG. 7A is a rear perspective view of an exemplary multi-function stroller in two-wheeled bicycle trailer carriage mode.
Figure 7B:
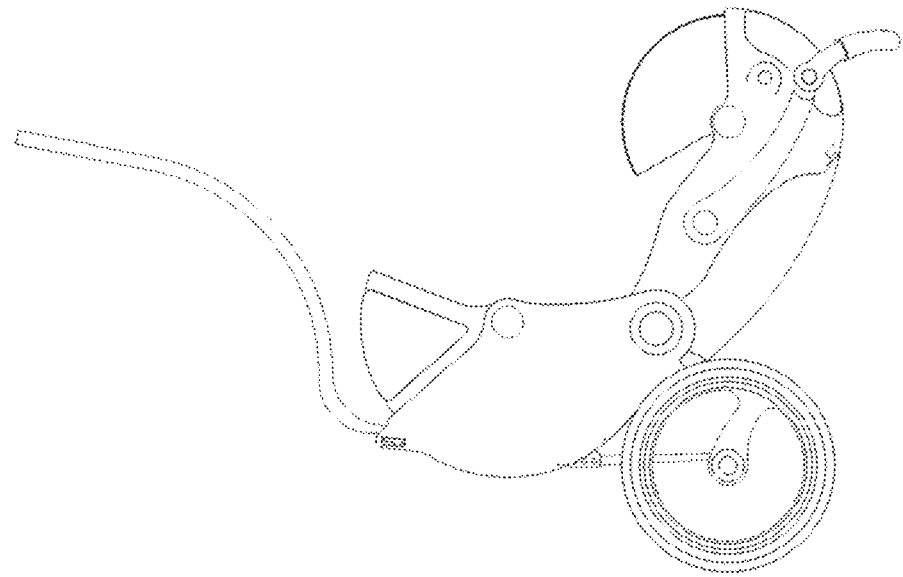
FIG. 7B is a side view of the embodiment shown in FIG. 7A.

When assembled, the multi-function stroller 100 may be pushed, pulled, towed, or carried on multiple surface types via an ergonomic and fully adjustable handle assembly 600. For example, in FIG. 1, multi-function stroller 100 is shown in a four-wheeled short wheelbase stroller configuration, and in this configuration, multi-function stroller 100 can be pushed or pulled. In FIG. 7A, multi-function stroller 100 is shown in a two-wheeled bicycle trailer carriage configuration, and in this configuration, multi-function stroller 100 can be towed.

Figure 25:
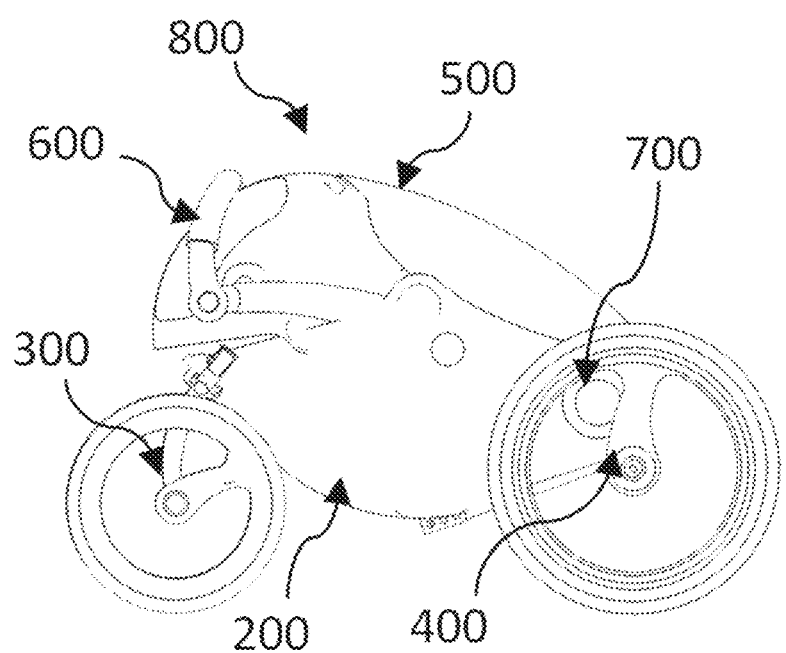
FIG. 25 is a side view of the multi-function stroller of FIG. 24 folded into fully compact mode.

Multi-function stroller 100 may be readily configured for a wide range of utilities and purposes by configuring the front and rear suspension assemblies 300 and 400 with the lower structure 200, the upper structure 500, or a combination thereof. A structural pivot connector mechanism 700 connecting lower structure 200 with upper structure 500 enables fast and simple assembly/disassembly for multi-function stroller 100 usages and storage compactness, as shown in FIG. 25. Multi-function stroller 100 may be configured for a number of mobility applications customized to a consumer/user's needs and age group demographic via a flexible axle and chassis architecture, as noted previously. For example, multiple mobility configurations of multi-function stroller 100 are shown in FIGS. 4-11, including a four-wheeled short wheelbase front facing occupant stroller (FIG. 4), a three-wheeled long wheelbase front facing occupant jogging stroller (FIGS. 5A and 5B), a three-wheeled short wheelbase front facing occupant stroller (FIGS. 6A and 6B), a two- and one-wheeled front facing occupant bicycle trailer carriage (FIGS. 7A, 7B and 8A, 8B), four-wheeled child wagon (FIGS. 9A and 9B), four-wheeled short wheelbase rear facing occupant pram (FIGS. 10A and 10B) and four-wheeled short wheelbase multiple occupant stroller with a plurality of occupant facing configurations (FIGS. 11A and 11B).

Figure 4:
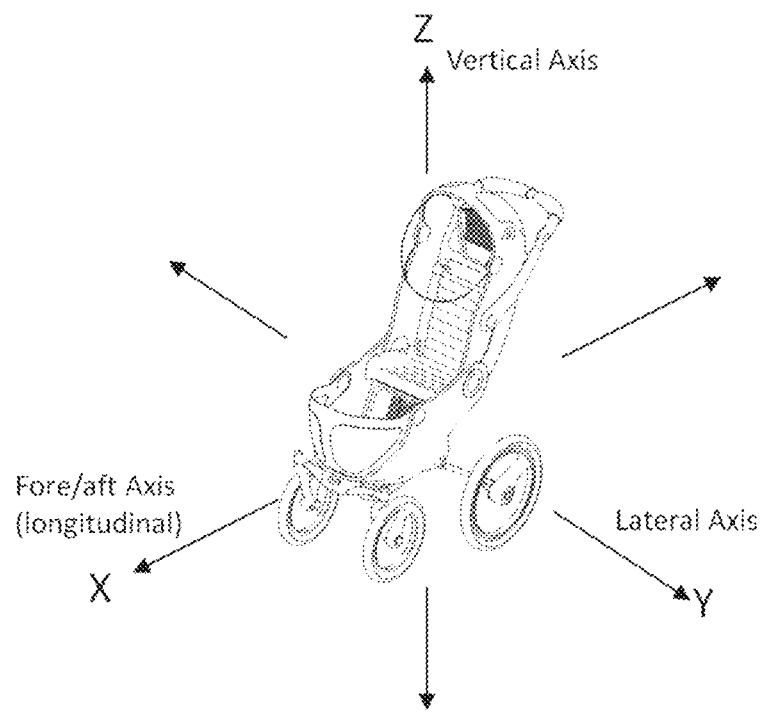
FIG. 4 is a front perspective view of an exemplary multi-function stroller detailing reference axis systems.
Figure 5A:
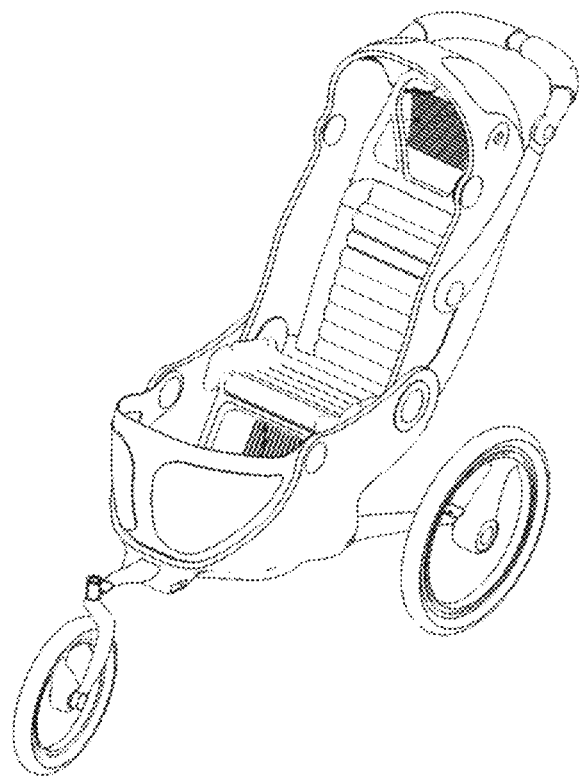
FIG. 5A is a front perspective view of an exemplary multi-function stroller in three-wheeled long wheelbase jogging stroller mode.
Figure 5B:
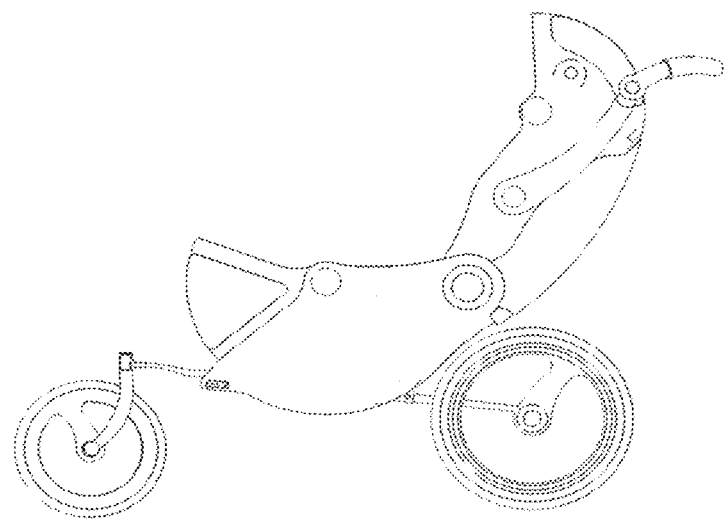
FIG. 5B is a side view of the embodiment shown in FIG. 5A.
Figure 6A:
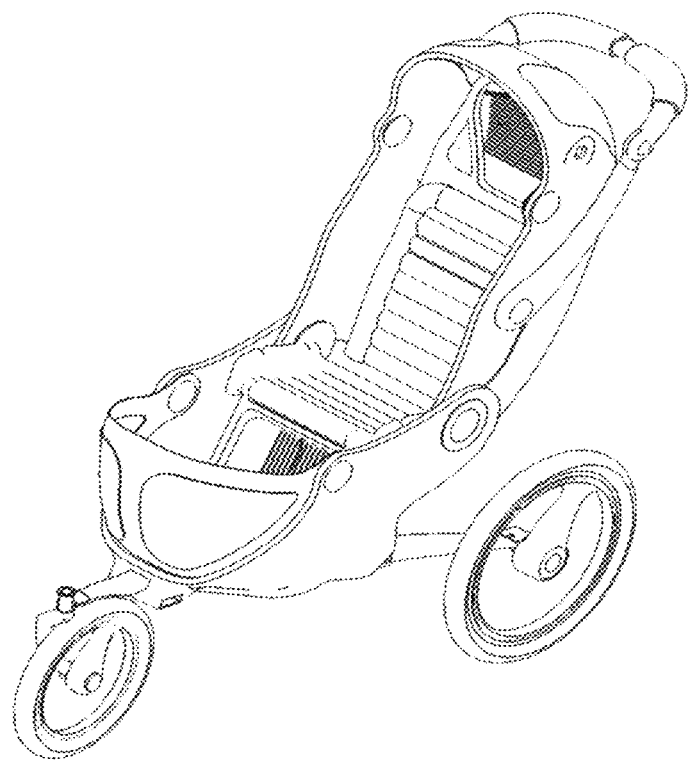
FIG. 6A is a front perspective view of an exemplary multi-function stroller in three-wheeled short wheelbase stroller mode.
Figure 6B:
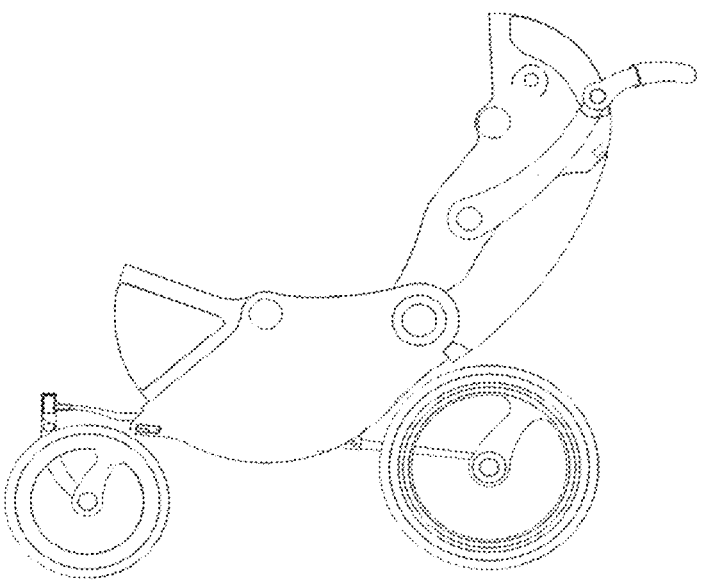
FIG. 6B is a side view of the embodiment shown in FIG. 6A.

Multi-function stroller 100, will be described herein with reference to three axes: a vertical axis (Z axis), a lateral axis (Y axis), and a fore/aft (longitudinal) axis (X axis). The translational movement about any of the three axes (three degrees of freedom) and the rotational movement about any of the three axes (three degrees of freedom) totals six degrees of freedom. Various elements of multi-function stroller 100, lower and upper structures 200 and 500, and suspension assemblies 300 and 400 will either move about or be constrained in these named six degrees of freedom. FIG. 4 illustrates the three named axes relative to multi-function stroller 100.

Figure 12:
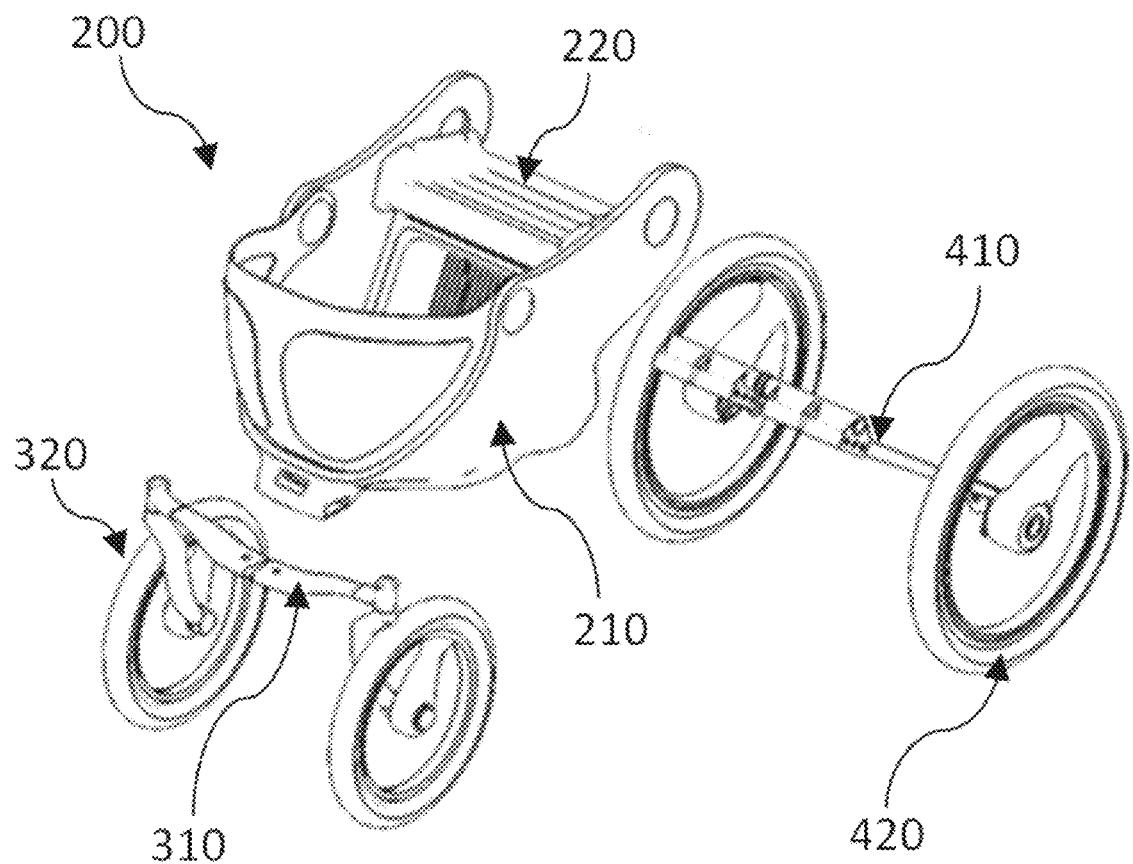
FIG. 12 shows an exploded perspective view of a lower rolling dynamic chassis structure assembly of an exemplary multi-function stroller.

Referring now to FIG. 12, an exploded view of an exemplary multi-function stroller 100's rolling dynamic lower chassis 200 and suspension structures 300, 400 is illustrated. The rolling dynamic lower chassis 200 and suspension structures 300, 400 may include: front suspension arm assembly 310, front wheel/tire assemblies 320, rear suspension arm assembly 410, and rear wheel/tire assemblies 420.

Referring still to FIG. 12, lower chassis structure assembly 200 provides the central structural chassis of multi-function stroller 100 that manages the ground/user interface. Chassis shell 210 is the main mounting structure for the front and rear suspension assemblies 310, 410 and lower seat and footrest assembly 220. Chassis shell 210 is preferably composed of a light-weight material having a high strength-to-weight ratio, such as composite sandwich panel, aluminum, an aluminum alloy, composites, plastics, non-man made organic structural materials, carbon fibers, including carbon fiber-reinforced polymers and carbon fiber-reinforced thermoplastics, or a combination thereof. Additionally, chassis shell 210 may use any combination of the aforementioned materials to reinforce the structure as required for product durability and/or safety.

Figure 13A:
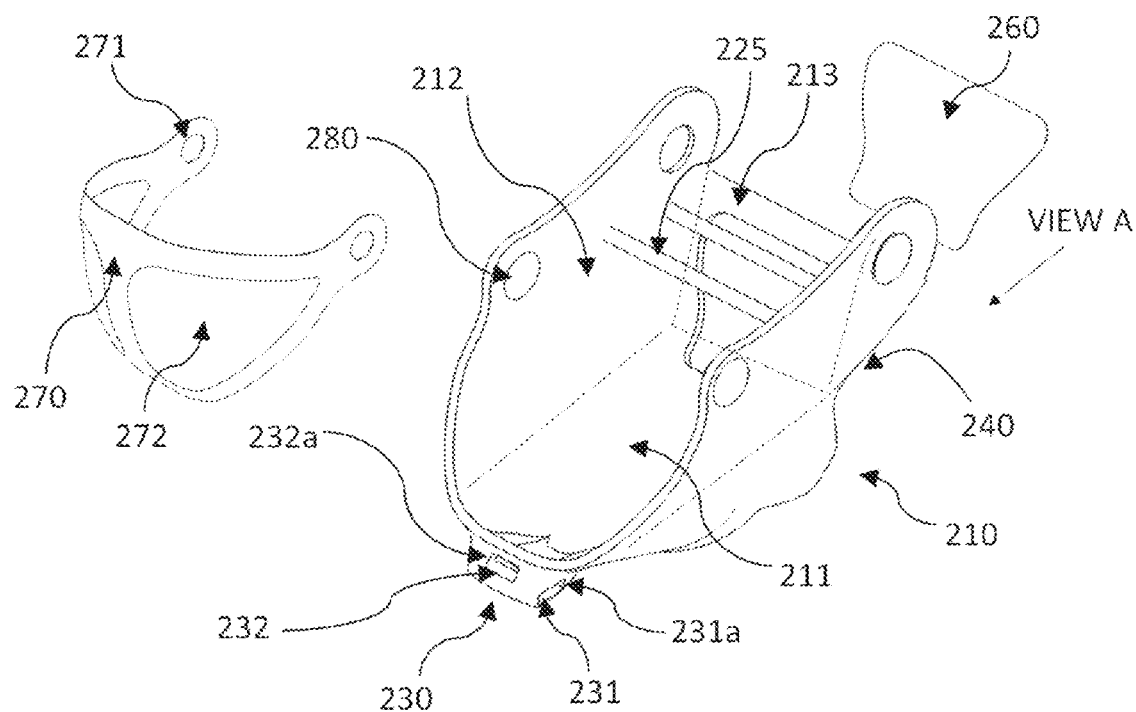
FIG. 13A is a close up view of a lower shell structure assembly of FIG. 12.

Referring specifically to FIG. 13A, an exemplary chassis shell 210 is shown generally having an open box section with a "spherical" sidewall shape. In this embodiment, chassis shell 210 is shown as a singular molded piece; it should be noted that chassis shell 210 may be manufactured with different processes and materials and may indeed take other shapes, and that chassis shell 210 shown in the figures is exemplary only. Chassis shell 210 may include opposed sidewall areas 212. Structural integrity of the open box section is achieved through lower floor and rear closing transverse areas 211 and 213 respectively connecting the opposed longitudinal sidewall areas 212. From their top leading edge sidewall areas 212 are shown with vertical faces that progressively curve to unite with lower transverse area 211. Lower transverse area 211 is typically flat in shape to accommodate the occupant's feet. Rear transverse area 213 is typically a flat vertical closing area joining with areas 211, 212. In addition to occupant accommodation, chassis shell 210 can provide storage capacity under the lower seat assembly 220 shown in FIG. 12. Lower storage utility can be accessed via an opening in rear transverse area 213. User belongings can then be secured through a lockable attached storage compartment lid 260.

Chassis shell 210 may include a front suspension mount reinforcement assembly 230. Front suspension mount assembly 230 may be a reinforced structural part co-molded with exemplary chassis shell 210. Front suspension mount assembly 230 is constructed to allow a flexible front suspension axle architecture for the multiple usages described above. In a two-wheeled front axle configuration, side mounts 231 provide secure fixing support for left and right side front suspension and wheel/tire assemblies 310 and 320 respectively. In a one-wheeled front axle configuration, center mount 232 provides secure fixing support for either the left or right side front suspension and wheel/tire assemblies 310 and 320 respectively. In addition, center mount 232 may provide a secure mounting connection with a separate bicycle trailer carriage hitch assembly (shown in FIGS. 7A and 7B) when multi-function stroller 100 is used in either a two- or one-wheeled bicycle trailer carriage mode.

Referring now to FIGS. 13A-15, chassis shell 210 may include a rear suspension axle reinforcement mount structure 240. Rear suspension mount assembly 240 may be a reinforced structural part co-molded with exemplary chassis shell 210. Suspension mount assembly 240 is constructed to allow a flexible rear suspension axle architecture for the multiple usages as described above. Rear suspension mount assembly 240 houses the rear suspension inboard mounting assembly 411. For a single occupant multi-function stroller 100, a two-wheeled rear axle configuration may be achieved with rear side mounts 412 which provide secure fixing support for left and right side rear suspension 410 and wheel/tire assemblies 420. For a double occupant multi-function stroller 100 where a narrower suspension track width is required, a two-wheeled rear axle configuration may be achieved with inner rear side mounts 413 which provide secure fixing support for left and right side rear suspension 410 and wheel/tire assemblies 420. A single occupant multi-function stroller 100 one-wheeled rear axle configuration may be achieved by using either side mount 413 to provide a secure fixing support for a single wheel either the left or right side rear suspension 410 and wheel/tire assemblies 420 rotated 180 degrees about the fore/aft axis X (i.e., the single suspension arm is inserted upside down).

Referring specifically to FIG. 13A, lower chassis shell 210 is shown with an exemplary lower occupant area visor 270. Visor 270 is a separate component to chassis shell 210 but may be part of the lower chassis shell assembly. Visor 270 may be manufactured using the same or similar materials as the chassis shell 210. Exemplary visor 270 may be configured to match the geometry of chassis shell 210 such that it may rotate and be stored inside chassis shell 210 when not in use. Rotation of visor 270 (laterally around the Y Axis) to a fully extended or a fully stored position is achieved through chassis shell 210 structural pivot points 280 and their mating connections with visor 270 pivot points 271. Visor 270 may function to: provide safety for the occupant's feet; provide a leading aerodynamic profile for use at speed in bicycle trailer carriage mode; protect the multi-function stroller 100 and occupants from environmental conditions, and to house the lightweight rain cover (not shown herein). FIG. 13A shows exemplary visor 270 with left and right side transparent window areas 272 configured to provide enhanced occupant forward visibility.

Lower chassis shell 210 may also optionally include reflectors and/or lights (not shown) to facilitate visibility of multi-function stroller 100 for safe operation.

Figure 14:
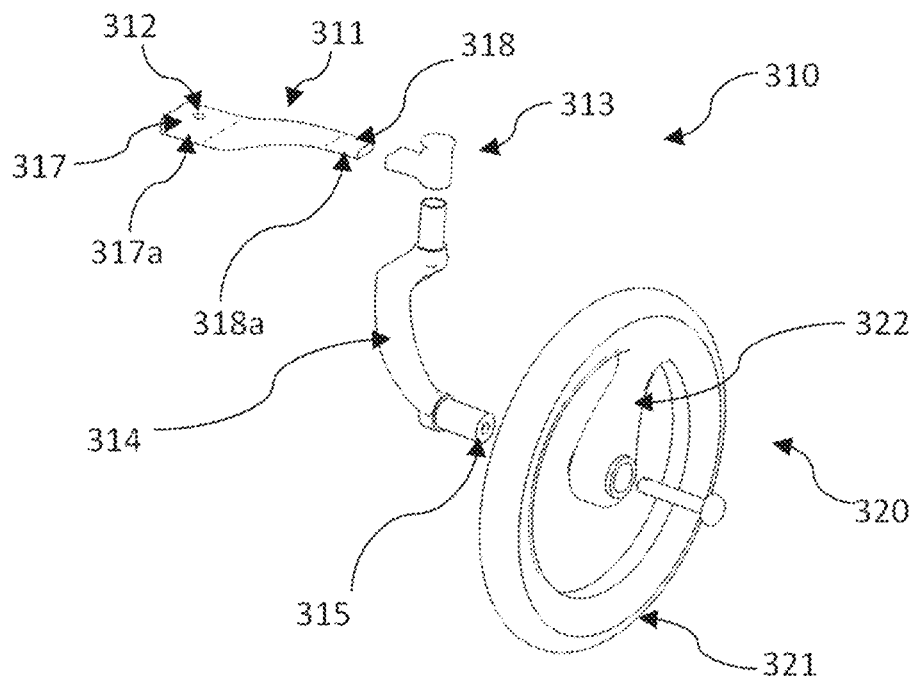
FIG. 14 is a close up exploded view of the front suspension/wheel/tire assembly of FIG. 12.
Figure 15:
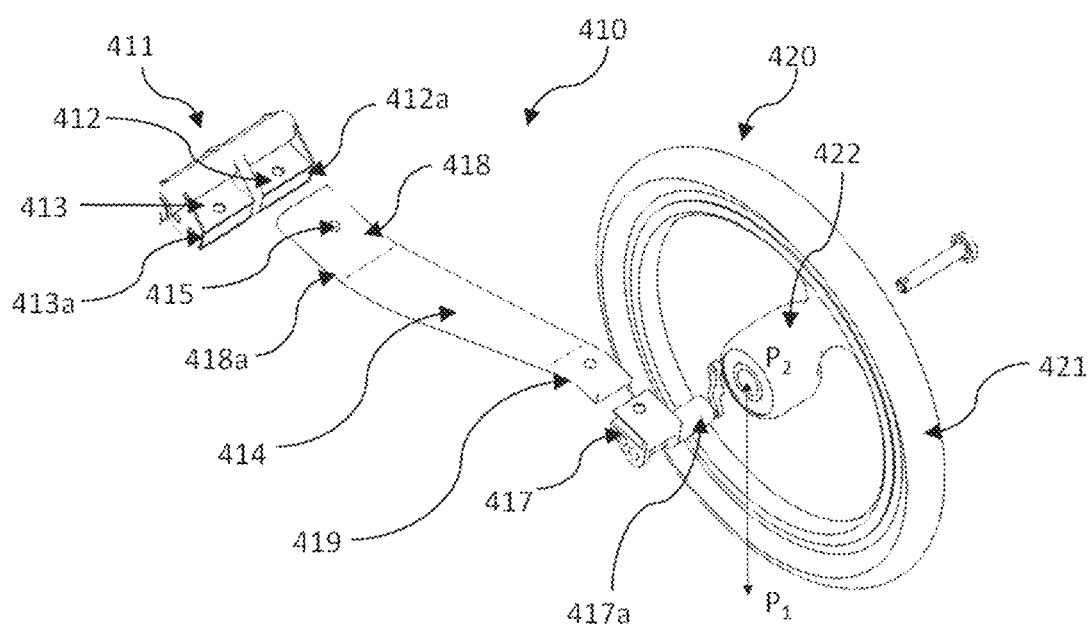
FIG. 15 is a close up exploded view of the rear suspension/wheel/tire assembly of FIG. 12.

Referring now to FIGS. 14 and 15, front suspension 310 and front wheel/tire assembly 320 and rear suspension 410 and rear wheel/tire assembly 420 will now be described in greater detail. Each suspension arm (front 311) and (rear 414) may be the sole suspension link between chassis shell 210 and each wheel/tire assembly 320 and 420 front and rear, respectively. Accordingly, each suspension arm front 311/rear 414 must counteract vertical, fore/aft, and lateral loads experienced by the tire/wheel assemblies 320/420. As will be described in greater detail herein, the geometries and non-linear spring constants of each suspension arm front 311/rear 414 allow the suspension system to handle the noted forces. Hence, suspension arms front 311/rear 414 of multi-function stroller 100 offer variable ride and handling control under a wide range of occupant loads and ride height configurations, and are engineered for optimal kinematics and compliances to provide multi-function stroller 100 with a comfortable controlled ride and safe/predictable/responsive handling dynamics.

Referring to FIG. 12, multi-function stroller 100's rolling dynamic lower chassis and suspension is shown comprising suspension assemblies front 310/rear 410. In the illustrated embodiment, rolling dynamic lower chassis 200 is configured with four individual suspension arm assemblies front 310/rear 410 not linked to one another, making the rolling dynamic lower chassis 200 an independent suspension system (i.e. wheel/tires 320 and 420 may move independently of one another). In other configurations, such as a three-wheeled or two-wheeled mobility configuration, the rolling dynamic lower chassis 200 may also be an independent suspension system, as suspension arm assemblies front 310/rear 410 may be connected to chassis shell 210 independently of one another, and are not linked by a shared axle. The rolling dynamic lower chassis 200 may include a plurality of front 310 and rear 410 suspension arm assemblies, and in some embodiments, front and/or rear suspension arm assemblies may be omitted depending upon the desired mobility configuration. In this manner, suspension arm assemblies front 310/rear 410 may be removable and connectable with chassis shell 210.

Referring again to FIGS. 14 and 15, the front 311/rear 414 suspension arms may be of a composite material or other light-weight materials. Preferably, a material having a high strength-to-weight ratio is selected. To account for varying loads that may be experienced by multi-function stroller 100, front 311/rear 414 suspension arms may be comprised of composite materials having varying spring constants (similar to a leaf spring) achieved through material property stiffness and/or geometry. This allows front 311/rear 414 suspension arms to achieve a variable spring rate and the capacity to stiffen automatically when varying loads are applied to multi-function stroller 100.

Figure 13B:
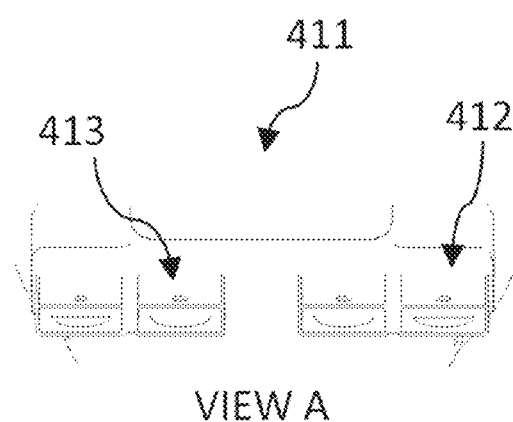
FIG. 13B is a close up view of Section A of FIG. 13A.

Referring now to FIGS. 13A, 13B, and 14, in one embodiment, each front suspension arm 311 comprises a chassis shell 210 inboard connecting portion 317, and an outboard wheel coupling portion 318. Connecting portion 317 of suspension arm 311 may attach to chassis shell 210, and may be slid in and out of slots 231 (for a two-wheeled front axle) or singularly into slot 232 (for a one-wheeled front axle) for assembly/disassembly (i.e., the suspension arm 311 is removable and connectable with chassis shell 210). The connecting portions 317 of suspension arm 311 may have mating securing mechanisms (e.g., tapered geometry) 317a that mate with receiving securing mechanisms 231a or 232a located within slots 231 and 232 of chassis shell 210. The engagement of the mating and receiving securing mechanisms secure and restrain the suspension arms 311 from moving about the six named degrees of freedom. In the illustrative embodiments shown in FIG. 13A and FIG. 14, the mating and receiving securing mechanisms are male and female portions of a dovetailed configuration. Other mating configuration geometries are possible. To further secure the suspension arms 311 into slots 231 and 232, suspension arm 311 may be pushed past a sprung-loaded retaining pin 312 that mates with a recessed hole (not shown) in slots 231 and 232 of chassis shell 210. For disassembly, the sprung-loaded retaining pin 312 may be quickly released, and the suspension arms 311 may be removed from their corresponding slots 231, 232.

Referring to FIG. 14, front suspension arm 311 may connect with the wheel/tire assembly 320 in the following exemplary manner. Generally, the arm distal coupling portion 318 of each suspension arm 311 connects with the suspension fork assembly 314 via a fork headstock and bearing assembly 313. In this embodiment, because the front wheels 320 are steered wheels, front suspension arms 311 must allow for front wheels 320 to rotate around the vertical axis Z when steered (i.e., caster wheels as commonly known in the art). Fork headstock and bearing assembly 313 allows the suspension fork 314 and the connected wheel 320 to rotate 360 degrees around the vertical axis Z. Additionally, suspension fork assembly 314 may be configured with a positive caster angle geometry to ensure that wheel 320 self-centers and aligns seamlessly with the fore/aft axis X when moving straight ahead, as is commonly known in the art. Furthermore, fork headstock and bearing assembly 313 may be modified to adjust the static toe as required by the user to suit his or her dynamic requirements particularly for straight ahead tracking at running speeds when multi-function stroller is used as a jogging stroller.

Referring to FIG. 15, in one embodiment, rear suspension arm assembly 410 comprises a suspension arm 414 and a chassis shell rear suspension bracket 411, which connects to the inboard connecting portion 418, and an outboard wheel coupling portion 419 of suspension arm 414. Connecting portion 418 of suspension arm 414 may attach to chassis shell 210 via an inboard mounting assembly 411, and may be slid in and out of slots 412 (for a two-wheeled rear axle) or singularly into slot 413 (for a one-wheeled rear axle) for assembly/disassembly (i.e., the suspension arm 414 is removable and connectable with chassis shell 210). The connecting portions 418 of suspension arm 414 may have mating securing mechanisms (e.g., tapered geometry) 418a that mate with receiving securing mechanisms 412a or 413a located within slots 412 and 413 of mounting assembly 411. The engagement of the mating and receiving securing mechanisms secure and restrain the suspension arms 414 from moving about the six named degrees of freedom. In the illustrative embodiment of FIG. 15, the mating and receiving securing mechanisms are male and female portions of a dovetailed configuration. Other mating configuration geometries are possible. To further secure the suspension arms 414 into slots 412 and 413, suspension arm 414 may be pushed past a sprung-loaded retaining pin 415 that mates with a recessed hole (not shown) in slots 412 and 413 of mounting assembly 411. For disassembly, the sprung-loaded retaining pin 415 may be quickly released, and the suspension arms 414 may be removed from their corresponding slots 412, 413.

Referring still to FIG. 15, rear suspension arm 414 may connect with the wheel/tire assembly 420 in the following exemplary manner. Generally, the arm distal coupling portion 419 of each suspension arm 414 connect with the wheel assembly 420 via a rear hub carrier assembly 417. Hub spindle axle 417a may in turn be coupled with a bearing (not shown) as part of wheel/tire assembly 420 to allow rotation about axis Y, allowing wheels 420 to rotate. The rear hub carrier assembly 417 may be configured in either a positive or negative/neutral camber relative to a true vertical axis Z. A static negative camber of the wheels 420 may be useful for off road or higher speed applications, as a negative camber can offer more stability through a more efficient Tire Contact Patch TCP as the wheel vertically articulates. Furthermore, the rear hub carrier assembly 417 may be modified to adjust the static camber, caster, and toe as required by the user to suit his or her dynamic requirements.

Figure 8A:
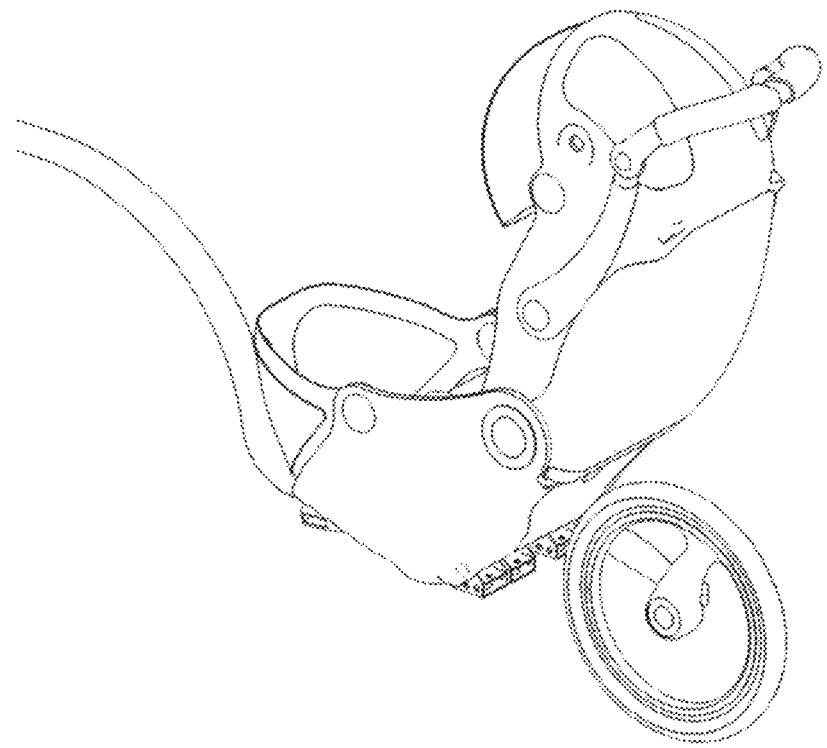
FIG. 8A is a rear perspective view of an exemplary multi-function stroller in one-wheeled bicycle trailer carriage mode.
Figure 8B:
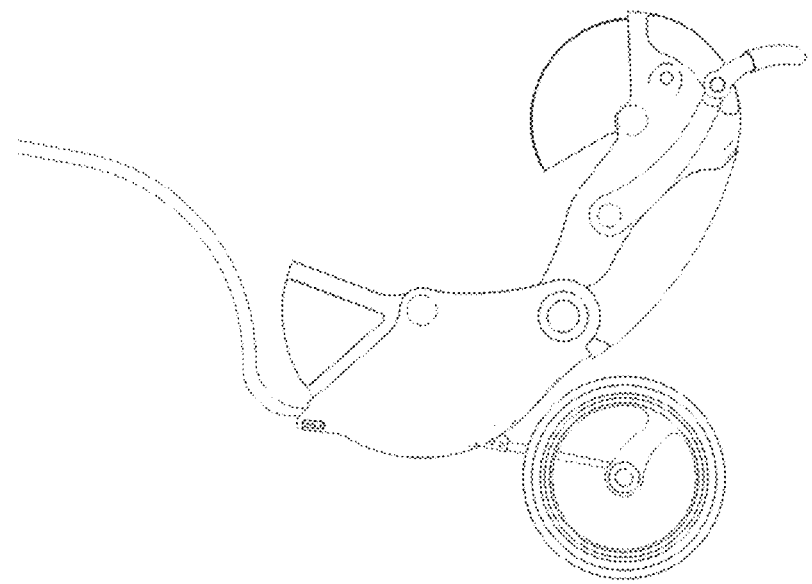
FIG. 8B is a side view of the embodiment shown in FIG. 8A.

Hub carrier assembly 417 may include an attachment point for a braking assembly (not shown), or other stationary parts such as a stator of an encoder sensor (not shown). The braking assembly may be configured to operably function in synchronization with another connecting device with multi-function stroller 100. For example, if multi-function stroller 100 is configured in a bicycle trailer carrier mobility mode (i.e. two- or one-wheeled rear axle) tow configuration as shown in FIG. 7A and FIG. 8A, and the multi-function stroller 100 is connected to a bike, the braking assembly can be configured to brake in synchronization with the brakes of the bike.

To ensure stability and safety at cycling speeds multi-function stroller 100 has the utility to lower its center of gravity position when configured as a bicycle trailer carriage in a two-or one-wheeled rear axle configuration. This is achieved by indexing the rear mounting assembly 411 rotating around the lateral axis Y to change the ride height from rear wheel center $P_1$ vertical axis Z position (stroller mode) to $P_2$ vertical axis Z position (bicycle trailer carriage mode) as detailed in FIG. 15.

Referring now to FIGS. 16A, 16B, and 16C, the geometries of the front 311 and rear 414 suspension arms will now be described. Both front suspension arms 311 and rear suspension arms 414 are illustrated having thicker lateral thicknesses $T_{yf}$ and $T_{yr}$ (or width) respectively at their arm proximal portions 317 front and 418 rear than at their arm distal portions 318 front and 419 rear. Both suspension arms 311 and 414 lateral thicknesses $T_{yf}$ and $T_{yr}$ narrow gradually along the length of the arm until the arm distal portions 318 and 419. This change in geometry and indeed potential material property stiffness changes from the proximal end to the distal end provide suspension arms 311 and 414 a variable lateral spring rate based on the lateral load generated at the Tire Contact Patch (TCP).

In this embodiment, each suspension arm 311 front and 414 rear is the sole suspension link between the base chassis shell 210 and the wheel/tire assemblies 320 front and 420 rear, and thus, they must support and counteract translational vertical, fore/aft, and lateral loads, as well as rotational forces about the vertical axis Z, fore/aft axis X, and lateral axis Y. Each suspension arm may be designed to counteract all six degrees of freedom.

Continuing with the embodiment, as each suspension arm 311 front and 414 rear are the primary members that counteract lateral forces experienced by the wheel/tire assemblies 320 front and 420 rear, the lateral thicknesses $T_{yf}$ and $T_{yr}$ must be selected to properly counteract these loads. The lateral thicknesses $T_{yf}$ and $T_{yr}$ control the lateral spring rate. The lateral thicknesses $T_{yf}$ and $T_{yr}$ must be thick enough to allow the tires 321 front and 421 rear to maintain a sufficient Tire Contact Patch (TCP), or contact interface between the ground and tires 321 front and 421 rear, when lateral forces are experienced. The lateral thicknesses $T_{yf}$ and $T_{yr}$ may be selected in the range of 25 mm (≈1 inch) to about 125 mm (≈5 inches).

Each suspension arm 311 front and 414 rear are also the primary members that counteract vertical forces experienced by the wheel/tire assemblies 320 front and 420 rear. The vertical thicknesses $T_{zf}$ and $T_{zr}$ control the vertical spring rate of the front suspension 311 and the rear suspension 414 system respectively, and thus the vertical thickness $T_{zf}$ and $T_{zr}$ (FIGS. 16B and 16C) must be thick enough such that suspension arms 311 front and 414 rear provide the proper stiffness to maintain a sufficient Tire Contact Patch TCP when vertical loads are experienced. Both suspension arms 311 and 414 vertical thicknesses $T_{zf}$ and $T_{zr}$ narrow gradually along the length of the arm until about the arm distal portions 318 and 419. This change in geometry and potential material property stiffness changes from the proximal end to the distal end provide suspension arms 311 and 414 a variable vertical spring rate based on the vertical load generated at the Tire Contact Patch (TCP).

The vertical thickness $T_{zf}$ and $T_{zr}$ may be selected in the range of 10 mm (≈0.4 inches) to about 50 mm (≈2 inches). The fore/aft length and vertical thickness $T_{zf}$ and $T_{zr}$ of each suspension arm 311 front and 414 rear controls the fore/aft compliance of the suspension system, and thus must be selected to counteract fore/aft loads. In summary, the position (or Tire Contact Patch TCP) of the tire/wheel assemblies 320 front and 420 rear is controlled in all six degrees of freedom by suspension arms 311 front and 414 rear.

Wheel/tire assemblies 320 front and 420 rear includes wheels 322 front, 422 rear and tires 321 front and 421 rear. Wheel/tire assemblies 320 front and 420 rear are preferably lightweight assembles to reduce the unsprung mass of the suspension system. The wheel/tire assembly is optimized for dynamic performance on a wide range of surfaces, as the suspension system is configurable as an independent suspension system. Although the wheel/tire assembly 320 front and 420 rear are illustrated in the various figures as including wheels 322 front, 422 rear and tires 321 front and 421 rear, these items may be interchangeable with other ground/chassis interface components, such as skis to be used in winter conditions. "Wheels", "tires", or "wheels/tires" will be used for exemplary purposes herein and in the appended claims, but it must be noted that "wheels", "tires", or "wheels/tires" may be substituted with and is interchangeable with any ground/chassis interface component.

Figure 17A:
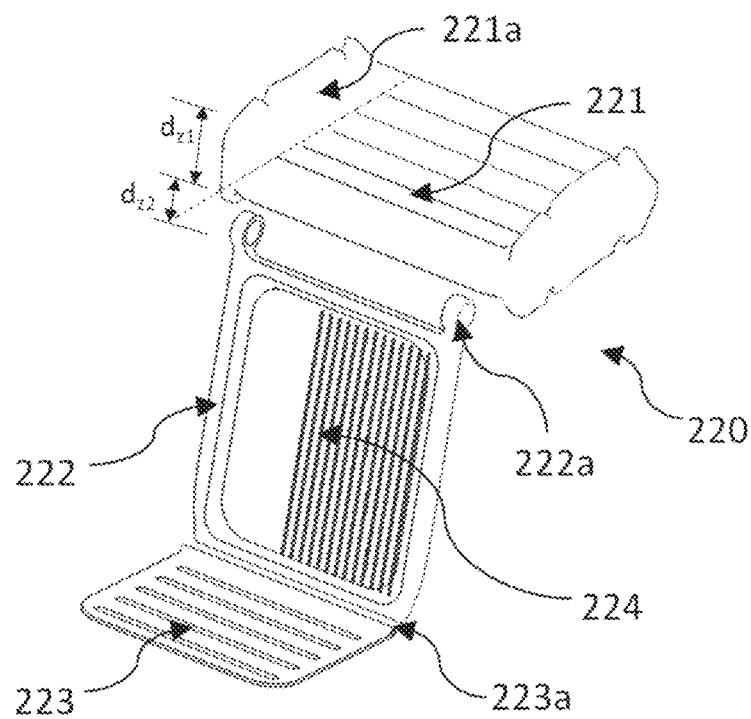
FIG. 17A is a close up exploded view of the lower seat assembly of the multi-function stroller of FIG. 12.
Figure 17B:
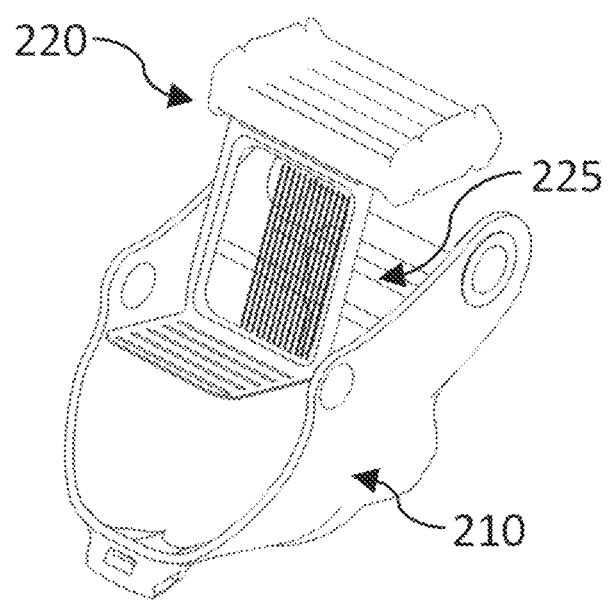
FIG. 17B is a close up view of the foot rest assembly of the multi-function stroller of FIG. 12.

Referring now to FIGS. 17A and 17B, the lower seat and foot rest assembly 220 will now be described. Lower seat and foot rest assembly 220 consists of a lower occupant seat cushion 221, occupant leg support structure 222 and occupant foot rest 223. Referring specifically to seat cushion 221; exemplary seat cushion 221 is shown generally as a rectangular sectional shape. In this embodiment seat cushion 221 is shown as a singular molded composite piece; it should be noted that seat cushion 221 may be manufactured with different processes and materials and indeed take other shapes, and that seat cushion 221 shown in the figures is exemplary only. Lower seat cushion 221 may be configured to provide the occupant with comfortable and supportive accommodation. Anthropometric accommodation is provided across a wide range of juvenile occupant ages and percentiles. Percentile accommodation of seat 221 is varied by adjusting the location of seat 221 attachment position relative to structural seat bracket 225 which is co-molded with chassis shell 210. This is achieved by rotating seat 221 through 180 degrees in the fore/aft axis X into two discrete positions. Vertical section 221a which is perpendicular to the horizontal cushion section has two different section depths $d_{z1}$ and $d_{z2}$. Position one when the smallest 221a depth $d_{z1}$ is connected to the structural seat bracket 225 seat cushion 221 is the lowest accommodation position. This position is configured to accommodate a juvenile occupant range of about 2 yrs-4 yrs of age. Rotating seat cushion through 180 degrees in the fore/aft axis X to position two, locates 221a depth $d_{z2}$ and seat cushion 221 in the highest accommodation position. This position is configured to accommodate a juvenile occupant range of about 1 yr-2 yrs of age. Leg and foot support is provided by leg support structure 222 and occupant foot rest 223 respectively. Leg support structure 222 is connected to seat cushion 221 at pivot points 222a. Leg support structure 222 is configured to provide comfort and support to the back of the occupant's lower legs. A removable fabric comfort mesh 224 ensures compliant support comfort as well as front access to the under seat cushion 221 storage area via an aperture in leg support structure 222. Foot support structure 223 is connected to leg support structure 222 at pivot points 223a. Pivot points 222a and 223a are configured with a revolute joint in the lateral axis Y to ensure leg support structure 222 and occupant foot rest 223 can rotate into the correct position when the lower seat and foot rest assembly 220 is rotated through 180 degrees in the fore/aft axis X to facilitate either of the two position seat 221 height accommodation settings.

Figure 18:
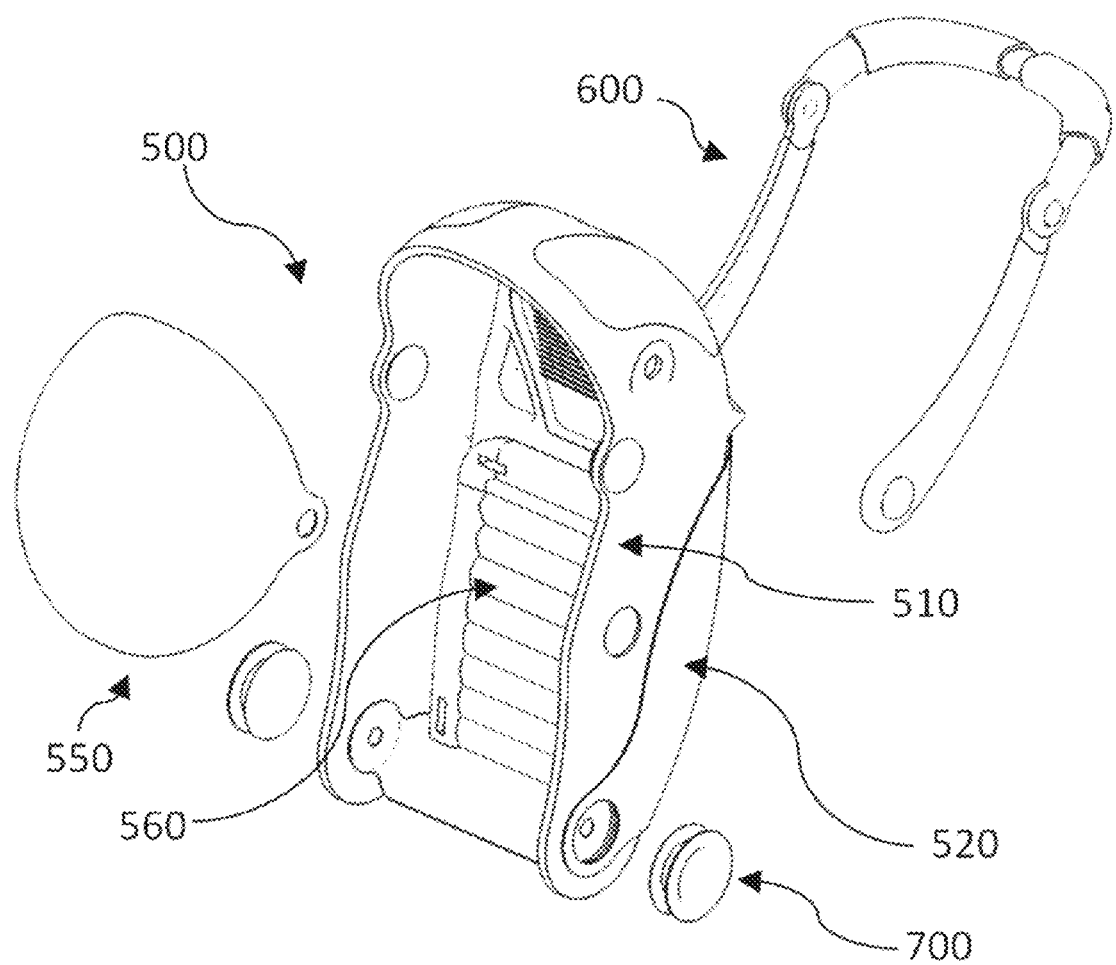
FIG. 18 shows an exploded perspective view of an upper structure assembly of an exemplary multi-function stroller.

Referring now to FIG. 18, upper structure assembly 500 provides the central occupant accommodation structure of multi-function stroller 100 that manages the occupant seated position/user interface. To facilitate occupant seating accommodation and additional mobility usage modes, upper structure assembly 500 can be disconnected, adjusted and repositioned at the structural pivot connector mechanism 700. Occupant shell 510 is the main mounting structure for the rear storage compartment assembly 520, upper occupant area visor 550, upper seat assembly 560 and structural pivot connector mechanism 700. Occupant shell 510 may be manufactured in the same or similar manner to lower chassis shell structure 210 and with the same or similar materials.

Figure 19:
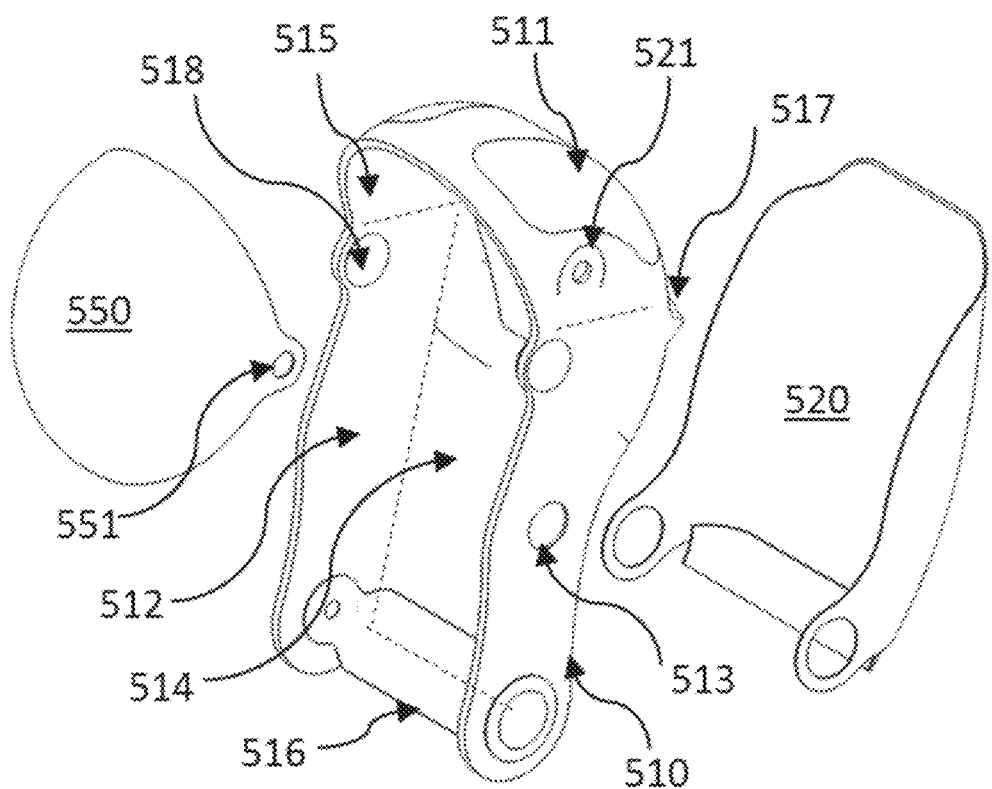
FIG. 19 is a close up view of the upper shell assembly shown in FIG. 18.

Referring specifically to FIG. 19, an exemplary occupant shell 510 is shown generally in an open box section with a "spherical" sidewall shape. In this embodiment, occupant shell 510 is shown as a singular molded piece; it should be noted that as with lower chassis shell 210, upper occupant shell 510 may be manufactured with different processes and materials and may indeed take other shapes, and that occupant shell 510 shown in the figures is exemplary only. As previously noted, exemplary shell 510 is shown as a singular piece. For a clear explanation of the utility herein occupant shell 510 will be described by detailing areas of its structure. Occupant shell 510 may include opposed sidewall areas 512. Structural integrity of the open box section is achieved through an upper hood structure 515 and rear closing transverse area 514 connecting the opposed longitudinal sidewall areas 512. From their top leading edge sidewall areas 512 are shown with horizontal faces that progressively curve to unite with rear closing transverse area 514. Transverse area 514 may be flat in shape to accommodate the upper seat structure 560. In addition to occupant accommodation, occupant shell 510 may provide the mounting structure for the prime storage capacity in multi-function stroller 100. Upper storage utility is facilitated through storage compartment assembly 520, where user belongings can be secured inside the lockable storage compartment 520. A rotational closing panel 516 provides an adjustable structural seal section between upper 500 and lower 200 structures; as well as a base section structure for exemplary bassinet mode shown in FIGS. 10A and 10B. Additionally, FIG. 19 shows exemplary occupant shell 510 with left and right side transparent window areas 511 configured to provide the user with visibility of the juvenile occupant when pushing multi-function stroller 100 from behind.

Occupant shell 510 may include a front suspension mount reinforcement assembly 517. Suspension mount assembly 517 is typically a reinforced structural part co-molded with exemplary shell 510. Suspension side mount assemblies 517 are constructed to allow a flexible front suspension axle architecture for child wagon mobility mode as detailed in FIGS. 9A and 9B. In a two-wheeled front axle configuration for wagon mode, side mounts 517 provide secure fixing support for left and right side front suspension arms 310 and wheel/tire assemblies 320. In addition, reinforced structural mounts 521 may be co-molded into occupant shell 510 to allow adjustable ergonomic handle assembly 600 to be attached for exemplary child wagon mobility mode shown in FIGS. 9A and 9B.

Referring still to FIG. 19, occupant shell 510 is shown with an exemplary upper occupant area visor 550. Visor 550 may be a separate component to shell 510. Visor 550 may be manufactured the same or similar materials to the shell 510, and is transparent to provide clear visibility to the seated occupant. Visor 550 may be constructed from tinted materials/finishes and/or a photochromic material which can change the visor tint based on solar load. Exemplary visor 550 may match the geometry of shell 510 such that it may rotate and be stored inside shell 510 when not in use. Rotation of visor 550 (laterally around the Y Axis) to a fully extended or a fully stored position is achieved through shell 510 structural pivot points 518 and their mating connection with visor 550 pivot points 551. Visor 550 may function to: provide safety for the occupant's head; provide a leading aerodynamic profile for use at speed in bicycle trailer carriage mode; protect from environmental conditions (incl.: UVA/UVB), and connect to the lightweight rain cover (not shown herein).

Occupant shell 510 may also optionally include reflectors and/or lights not shown to facilitate visibility of multi-function stroller 100 for safe operation.

Figure 20:
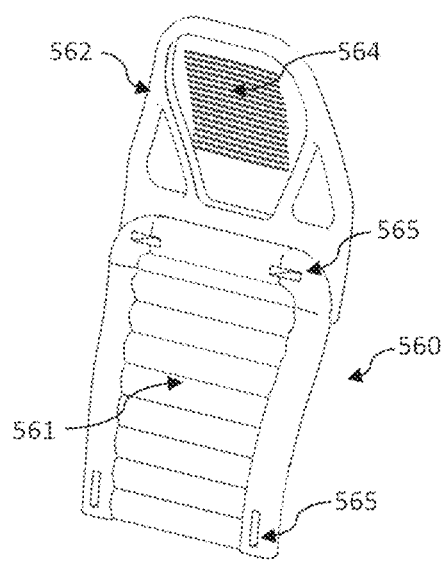
FIG. 20 is a close up exploded view of the upper seat and head rest assemblies shown in FIG. 18.

With reference to FIG. 20, the upper seat assembly 560 will now be described. Upper seat assembly 560 consists of an upper occupant seat squab cushion 56 land headrest structure 562. Referring specifically to squab cushion 561; exemplary squab cushion 561 is shown generally as a rectangular sectional shape. In this embodiment squab cushion 561 is shown as a singular molded composite piece that is co-molded with occupant shell 510. It should be noted that squab cushion 561 may be manufactured with different architectures, processes and materials and may indeed take other shapes, and that squab cushion 561 shown in the figures is exemplary only. Upper squab cushion 561 is configured to provide the occupant with comfortable and supportive accommodation. Anthropometric accommodation is provided across a wide range of juvenile occupant ages and percentiles. Percentile accommodation of upper squab cushion 561 is varied in the vertical axis Z by the relative dependent variation and height position of exemplary lower seat and foot rest assembly 220 as described above. The vertical axis Z position of lower seat and foot rest assembly 220 relative to upper seat assembly 560 is configured to accommodate a juvenile occupant range of 1 yr-4 yrs of age. A removable fabric comfort headrest mesh 564 ensures compliant support comfort for an occupant's head when in position as well as clearance for an occupant's head when mesh 564 is removed when they are wearing a bicycle crash helmet during bicycle trailer carriage mobility mode. In addition, upper seat assembly 560 provides sufficient access clearance holes 565 for safety harness strapping. Safety harness assembly maybe anchored at a reinforcement attachment structure co-molded with occupant shell 510 and lower chassis shell 210.

Referring now to FIG. 21, an adjustable ergonomic handle assembly 600 is shown comprising a handle 603, handle arm upper 602, and handle arm lower 601. A user may utilize the handle 603 to push, pull, tow, or carry multi-function stroller 100. The handle 603 is flexible and may be made of a composite, aluminum, or other light-weight material. The handle 603 may comprise a grip 604 that may be made of a soft rubber compound or foam, for example. The handle 603 may be adjusted for position in the fore/aft axis X and the vertical axis Z as desired by a user by rotating the handle 603 around the lateral axis Y at the attachment joints 603a and 602a of the handle arm upper 602. In addition, further adjustment and position can be obtained in the fore/aft axis X and the vertical axis Z through the telescopic translational joint between handle arm upper 602 and handle arm lower 601. Further, fore/aft axis X and the vertical axis Z adjustment obtained at the attachment joints 601a between handle arm lower 601 and pivots points 513 (FIG. 19) located on the upper occupant shell structure 510. Handle assembly 600 is thus versatile in that it can accommodate the ergonomic requirements of users for many percentiles. FIG. 21 illustrates the telescopic capacity length $L_1$ of handle arm upper 602 and handle arm lower 601. All adjustment functionality of handle assembly 600 is achieved at handle 603 where assembly 600 may be locked in or disengaged from a particular position by mechanical methods known in the art.

Figure 10A:
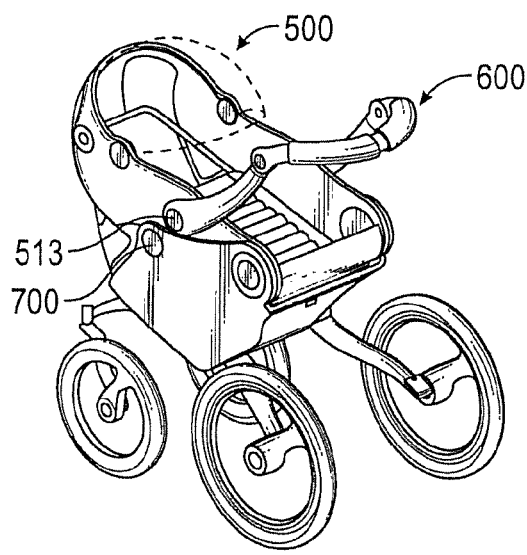
FIG. 10A is a front perspective view of an exemplary multi-function stroller in four-wheeled short wheelbase stroller axle mode in an infant bassinet configuration.
Figure 10B:
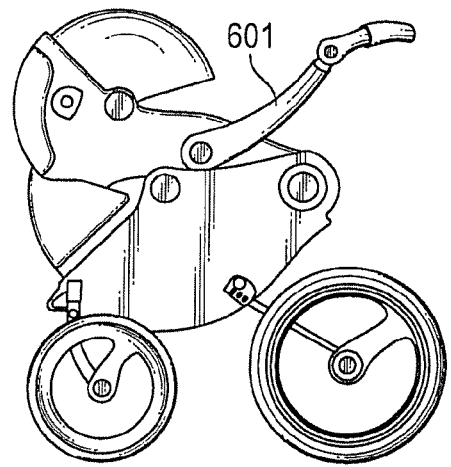
FIG. 10B is a side view of the embodiment shown in FIG. 10A.
Figure 10C:
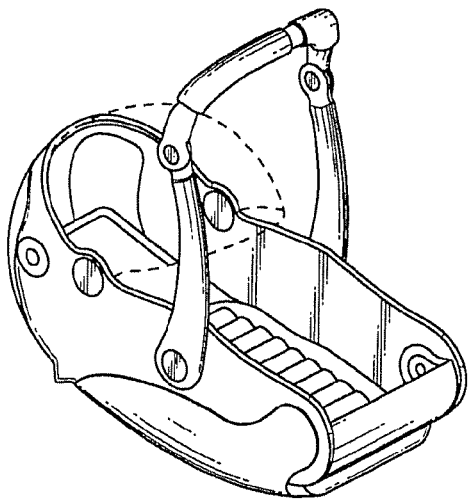
FIG. 10C is a front perspective view of an exemplary bassinet separated from the multi-function stroller.
Figure 10D:
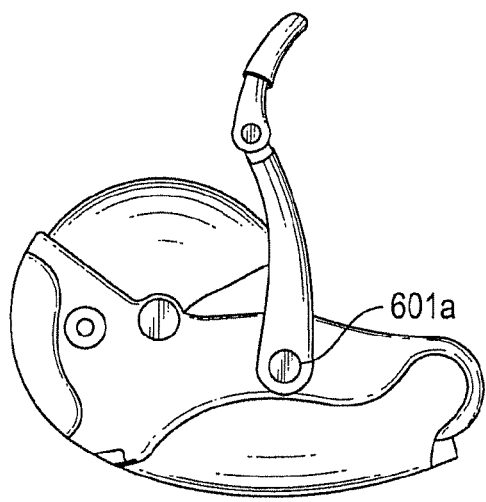
FIG. 10D is a side view of the bassinet shown in FIG. 10C.
Figure 11A:
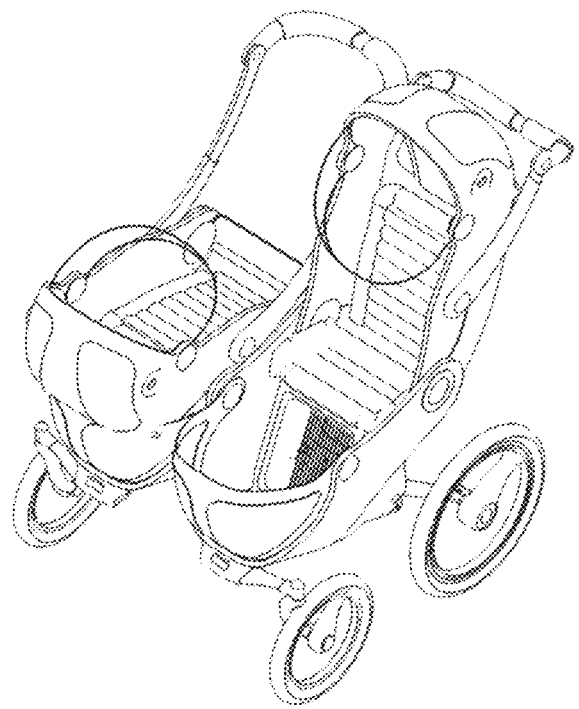
FIG. 11A is a front perspective view of an exemplary multi-function stroller in four-wheeled extended track short wheelbase stroller axle mode in a double occupant configuration.
Figure 11B:
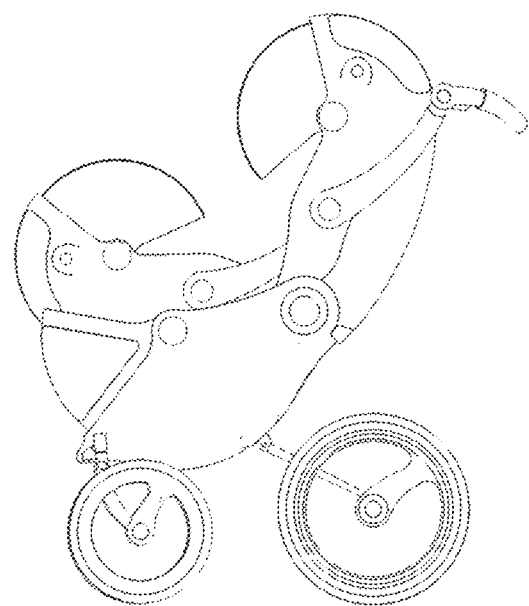
FIG. 11B is a side view of the embodiment shown in FIG. 11A.

Referring to FIG. 10A, handle assembly 600 may be released at its attachment joints 601a between handle arm lower 601 and pivots points 513 located on the upper occupant shell structure assembly 500 and subsequently repositioned by rotating handle assembly 600 180 degrees about the vertical axis Z and reattached at the same points. In this exemplary pram mode configuration, multi-function stroller 100 can be pushed as a rear facing pram for a 0-1 year old infant. In addition, when upper occupant structure assembly 500 is disconnected at structural pivot connector mechanism 700; handle assembly 600 can be used to carry upper occupant structure assembly 500 as a separate exemplary bassinet.

Figure 9A:
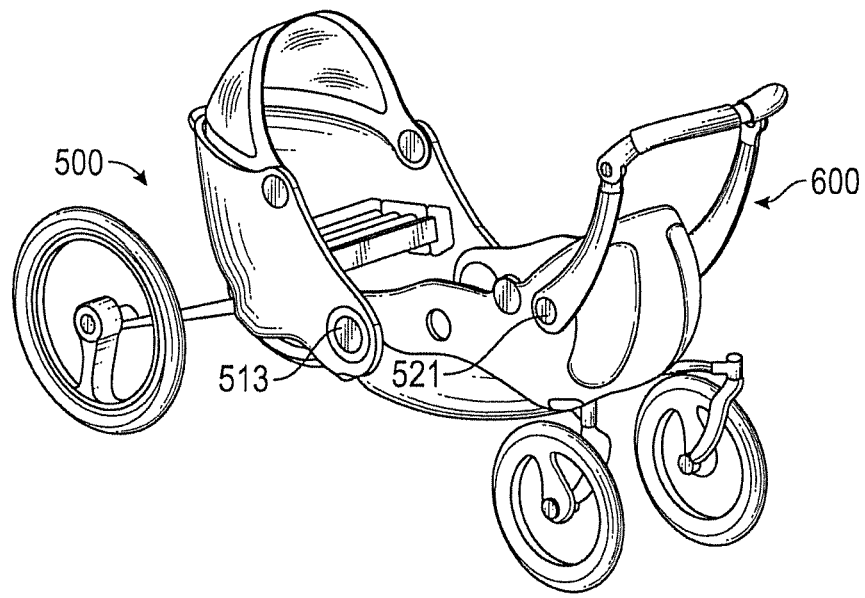
FIG. 9A is a front perspective view of an exemplary multi-function stroller in four-wheeled wagon mode.
Figure 9B:
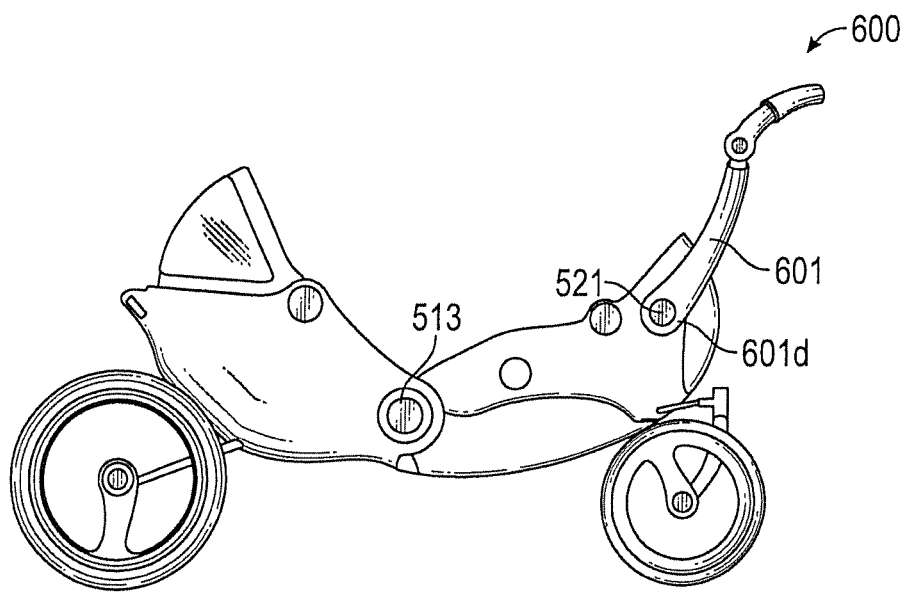
FIG. 9B is a side view of the embodiment shown in FIG. 9A.

Referring to FIGS. 9A, 9B, and 19, handle assembly 600 may be released at its attachment joints 601a between handle arm lower 601 and pivots points 513 located on the upper occupant shell structure assembly 500 and subsequently reattached at pivot attachment points 521. In this exemplary wagon mode configuration, multi-function stroller 100 can be pulled as a child wagon.

Structural pivot connector mechanism 700 will now be described. Referring now to FIGS. 22A and 22B, structural pivot connector mechanism 700 is shown comprising an outer push button release 701, lower chassis shell structural pivot housing 702, outer push button thrust plate 703, load transfer gear 704, outer coil spring 705, slide shaft 706, inner coil spring 707, upper shell structural pivot housing 708 and inner release pull button 709. Secure and safe relative rotation and movement at structural pivot connector mechanism 700 is achieved through lower chassis shell structural pivot housing 702 and upper shell structural pivot housing 708 being rigidly attached to lower chassis shell structure assembly 200 and upper occupant shell assembly 500 respectively.

Figure 23A:
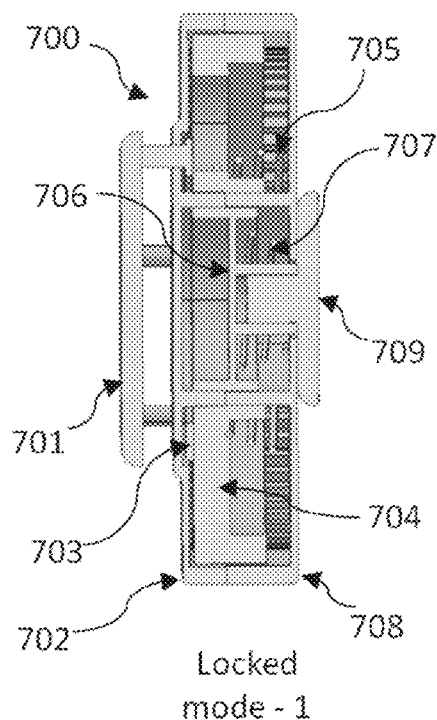
FIG. 23A is a sectional view of the structural pivot connector mechanism shown in FIG. 22 illustrated in locked mode.

Referring now to FIG. 23A, structural pivot connector mechanism 700 is configured to allow lower chassis shell structure assembly 200 and upper occupant shell assembly 500 to be securely and safely locked before use by an occupant (locked mode-1). Locked mode-1 is achieved as outer coil spring 705 retains load transfer gear 704 in a simultaneous engagement position between lower chassis shell structural pivot housing 702 and upper shell structural pivot housing 708 geared inner annuli. As noted above, the engagement of the structural pivot connector mechanism 700 in the locked position securely connects lower chassis structure 200 with upper occupant structure 500, and this connection acts to counteract all loads and moments experienced in the cited six degrees of freedom by multi-function stroller 100.

Figure 23B:
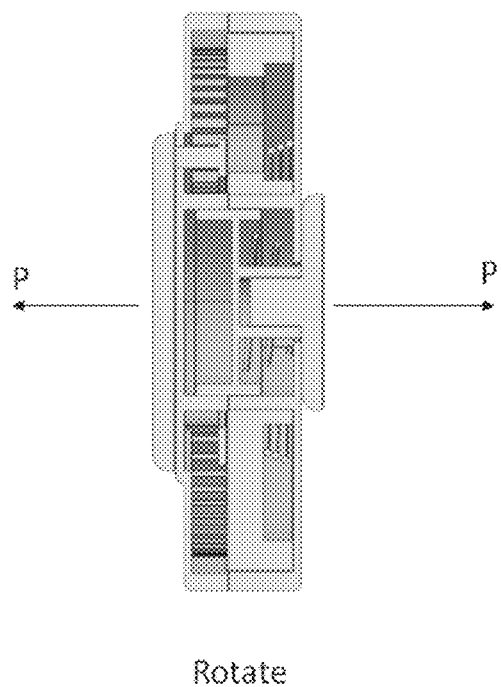
FIG. 23B is a sectional view of the structural pivot connector mechanism shown in FIG. 22 illustrated in rotate mode.

Referring now to FIG. 23B, structural pivot connector mechanism 700 also allows relative rotational movement (rotate mode-2) between lower chassis shell structure assembly 200 and upper occupant shell assembly 500 to facilitate adjustment of occupant seat 560 into a reclined position; as well as quick fold storage mode 800. Rotate mode-2 is achieved as outer push button release 701 pushes load transfer gear 704 to only engage with the geared inner annulus of upper shell structural pivot housing 708 facilitating a free rotational degree of freedom around structural pivot connector mechanism 700 pivot axis (P) on slide shaft 706.

Figure 23C:
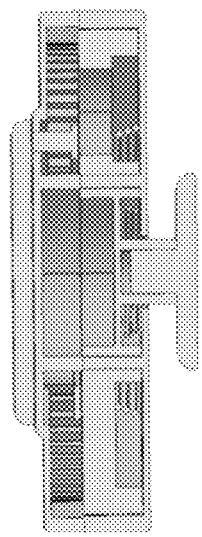
FIG. 23C is a sectional view of the structural pivot connector mechanism shown in FIG. 22 illustrated in release mode.

Referring now to FIG. 23C, structural pivot connector mechanism 700 allows full release (release mode-3) and separation between lower chassis shell structure assembly 200 and upper occupant shell assembly 500. Release mode-3 is achieved by pulling inner release pull button 709 pulling with it slide shaft 706 and simultaneously pushing outer push button release 701 which pushes load transfer gear 704 to only engage with the geared inner annulus of upper shell structural pivot housing 708 effectively separating lower chassis shell structural pivot housing 702 and upper shell structural pivot housing 708.

Figure 24:
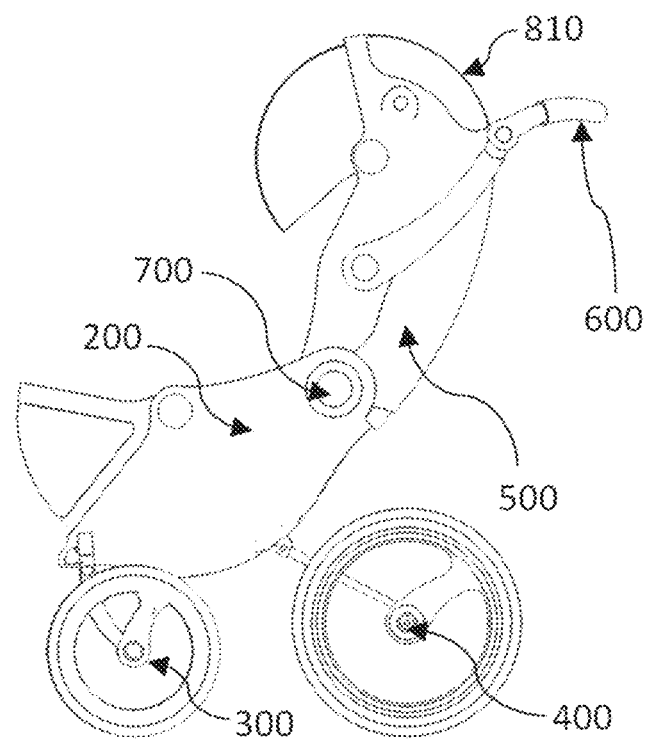
FIG. 24 is a side view of an exemplary multi-function stroller in a mobility mode.

Referring now to FIGS. 24 and 25, the multi-function stroller 100 may be folded into a compact storage mode in the following manner. First, assuming the lower chassis structure 200, front suspension assembly 300, rear suspension assembly 400, upper occupant structure 500, adjustable handle assembly 600 and structural pivot connector mechanism 700 are fully assembled, multi-function stroller 100 may be folded into a quick fold storage mode 800 using the procedure detailed above. FIG. 25 shows multi-function stroller 100 in quick fold storage mode 800. Folding universal multi-function stroller 100 into quick fold mode 800 reduces its fore/aft and vertical profile, thus making it easier to stow in spaces with limited fore/aft and vertical areas. When multi-function stroller 100 is in mobility mode 810, as shown in FIG. 24, a locking support structure (not shown) or other securing mechanism may optionally be included to further stabilize the structural pivot connector mechanism 700 and prevent multi-function stroller 100 from inadvertently folding into quick fold storage mode 800.

What is claimed as new and desired to be protected by Letters Patent of the United States is:

1. A mobility device capable of being configured in a plurality of configurations, comprising:
 a lower structure including a chassis shell having lower floor and rear closing transverse areas connecting opposed sidewalls and a front suspension arm mount assembly and a rear suspension arm mount assembly; each of said suspension arm mount assemblies having a suspension arm mount for receiving a suspension arm;
 said suspension arm having a connecting portion and a wheel coupling portion, said connecting portion adapted to be connectable and removable with one of said suspension arm mounts and said wheel coupling portion configured to be coupled with a wheel/tire assembly;
 an upper occupant shell structure assembly; and
 a pivot connector for coupling/decoupling said upper occupant shell structure assembly with/from said chassis shell, said pivot connector allowing for position adjustment of at least one of said shells about an axis of rotation such that said shells can be positioned in the desired configuration.

2. The mobility device of claim 1, wherein said mobility device is configurable in at least two of: a one-wheeled configuration, a two-wheeled configuration, a three-wheeled configuration, or a four-wheeled configuration.

3. The mobility device of claim 1, wherein said front suspension arm mount assembly comprises at least three suspension arm mounts.

4. The mobility device of claim 1, wherein said rear suspension arm mount assembly comprises at least four suspension arm mounts, including at least two outboard suspension arm mounts and at least two inboard suspension arm mounts.

5. The mobility device of claim 1, wherein said rear suspension arm mount assembly is adjustable about a pivot axis such that the ride height of said mobility device can be varied.

6. The mobility device of claim 1, wherein said upper occupant shell structure assembly further comprises an upper suspension mount assembly, said upper suspension arm mount assembly provided with an upper suspension arm mount.

7. The mobility device of claim 1, wherein a handle pivot point is disposed on at least one of said shells, said handle pivot point for receiving a handle assembly, said handle assembly being telescopically adjustable.

8. The mobility device of claim 1, wherein said mobility device is configurable in at least two of: a four-wheeled short wheelbase front facing occupant stroller, a three-wheeled long wheelbase front facing occupant jogging stroller, a three-wheeled short wheelbase front facing occupant stroller, a two-wheeled front facing occupant bicycle trailer carriage, a one-wheeled front facing occupant bicycle trailer carriage, a four-wheeled child wagon, four-wheeled short wheelbase rear facing occupant pram, or a four-wheeled short wheelbase multiple occupant stroller with a plurality of occupant facing configurations.

9. A mobility device, comprising:
 a chassis shell having a front portion and a rear portion; said chassis shell having lower floor and rear closing transverse areas connecting opposed sidewalls;
 a plurality of mounts each adapted to be coupled with a connecting portion of a suspension arm, said suspension arm having a wheel coupling portion opposite said connecting portion, said wheel coupling portion adapted to be coupled with a wheel/tire assembly; and
 at least two mounts being disposed about each of said front portion and said rear portion of said chassis shell such that said mobility device is configurable in at least two of: a four-wheeled configuration, a three-wheeled configuration, a two-wheeled configuration, or a one-wheeled configuration,
 wherein said chassis shell is coupled with an occupant shell by a pivot connector, said pivot connector allowing for adjustment of at least one of said occupant shell and said chassis shell about an axis of rotation.

10. The mobility device of claim 9, wherein said occupant shell further comprises an upper mount.

11. The mobility device of claim 9, wherein a handle assembly is coupled with at least one of said occupant shell and said chassis shell for pushing, pulling, towing, and carrying said chassis, said handle assembly being telescopically adjustable.

12. The mobility device of claim 9, wherein said mounts disposed about said rear portion are adjustable about a pivot axis such that the ride height of said mobility device can be varied.

13. The mobility device of claim 11, wherein the lateral thickness and vertical thickness of said suspension arm gradually decreases from said connecting portion to said wheel coupling portion.

14. A mobility device, comprising:
 a chassis shell having lower floor and rear closing transverse areas connecting opposed sidewalls and a plurality of mounts, each of said mounts adapted to be coupled with a connecting portion of a suspension arm, said suspension arm adapted to be coupled with a wheel/tire assembly at its end opposite said connecting portion; and
 said suspension arm mounts disposed about said chassis shell such that said mobility device is convertible between at least two of: a four-wheeled configuration, a three-wheeled configuration, a two-wheeled configuration, or a one-wheeled configuration,
 wherein said chassis shell is coupled with an upper occupant shell structure assembly by a shell pivot connector, said shell pivot connector configured to couple/decouple said chassis shell with said upper occupant shell structure assembly and to allow for adjustment of said upper occupant shell structure assembly relative to said chassis shell such that said upper occupant shell structure assembly may be repositioned about a pivot axis.

15. The mobility device of claim 14, wherein said chassis shell comprises a front suspension mount assembly and a rear suspension mount assembly, each suspension mount assembly configured to house said mounts.

16. A mobility device, comprising:
a chassis shell having lower floor and rear closing transverse areas connecting opposed sidewalls and a plurality of mounts, each of said mounts adapted to be coupled with a connecting portion of a suspension arm, said suspension arm adapted to be coupled with a wheel/tire assembly at its end opposite said connecting portion; and
said suspension arm mounts disposed about said chassis shell such that said mobility device is convertible between at least two of: a four-wheeled configuration, a three-wheeled configuration, a two-wheeled configuration, or a one-wheeled configuration,
wherein said chassis shell comprises a front suspension mount assembly and a rear suspension mount assembly, each suspension mount assembly configured to house said mounts
wherein said front suspension mount assembly comprises a center mount and two side mounts.

17. The mobility device of claim 15, wherein said rear suspension mount assembly is adjustable to vary the ride height of said mobility device.

18. The mobility device of claim 14, wherein a handle assembly is coupled with at least one of said upper occupant shell structure assembly and said chassis shell, said handle assembly being configured to be telescopically adjustable.

\* \* \* \* \*